United States Patent
Powell et al.

(10) Patent No.: US 9,758,842 B2
(45) Date of Patent: Sep. 12, 2017

(54) METHODS AND SYSTEMS FOR PROCESSING A REACTION PRODUCT MIXTURE OF CELLULOSIC BIOMASS MATERIAL

(71) Applicant: SHELL OIL COMPANY, Houston, TX (US)

(72) Inventors: Joseph Broun Powell, Houston, TX (US); Molly Gilchrest, Houston, TX (US); Lamar Lane Joffrion, Sugar Land, TX (US); Kimberly Ann Johnson, Richmond, TX (US); Thomas Lamar Flowers, Lumberton, TX (US); Franklin Eugene Caputo, Houston, TX (US); Todd Paul Peltier, Houston, TX (US)

(73) Assignee: SHELL OIL COMPANY, Houston, TX (US)

( * ) Notice: Subject to any disclaimer, the term of this patent is extended or adjusted under 35 U.S.C. 154(b) by 429 days.

(21) Appl. No.: 14/485,906

(22) Filed: Sep. 15, 2014

(65) Prior Publication Data

US 2015/0176093 A1  Jun. 25, 2015

Related U.S. Application Data

(60) Provisional application No. 61/919,221, filed on Dec. 20, 2013.

(51) Int. Cl.
| | |
|---|---|
| *C13K 1/04* | (2006.01) |
| *C10G 1/06* | (2006.01) |
| *C10B 3/00* | (2006.01) |
| *B01J 19/00* | (2006.01) |

(Continued)

(52) U.S. Cl.
CPC ............... *C13K 1/04* (2013.01); *B01J 19/24* (2013.01); *B01J 19/245* (2013.01); *C10G 1/065* (2013.01); *C10G 3/00* (2013.01); *B01J 2219/24* (2013.01); *C10G 2300/1014* (2013.01); *Y02P 30/20* (2015.11)

(58) Field of Classification Search
CPC . C13K 1/04; C10G 1/065; C10G 3/00; C10G 2300/1014; B01J 19/245; B01J 19/24; B01J 2219/24
See application file for complete search history.

(56) References Cited

U.S. PATENT DOCUMENTS

| | | |
|---|---|---|
| 3,650,889 A | 3/1972 | Fogman et al. |
| 5,715,763 A | 2/1998 | Fornetti et al. |
| 6,936,159 B1 | 8/2005 | Kean |

(Continued)

OTHER PUBLICATIONS

Written Opinion of the International Searching Authority dated Jan. 8, 2015 for PCT/US2014/055306.

*Primary Examiner* — David A Reifsnyder

(57) ABSTRACT

Processing of a reaction product mixture of cellulosic biomass material containing at least one volatile organic compound at least one of lignin, a lignin-derived compound, unextracted cellulose, unextracted hemicellulose, a caramelan, and any combination thereof by vaporizing the at least one volatile organic compound using at least thermal energy generated by combusting at least a portion of the reaction product mixture. In a particular embodiment, the reaction product mixture comes from reactions involving deconstruction (or digestion) of cellulosic biomass which contains various polysaccharides (e.g., carbohydrates) and lignin.

16 Claims, 6 Drawing Sheets

(51) Int. Cl.
*B01J 19/24* (2006.01)
*C10G 3/00* (2006.01)

(56) References Cited

U.S. PATENT DOCUMENTS

| | | |
|---|---|---|
| 2007/0098625 A1 | 5/2007 | Adams et al. |
| 2010/0236988 A1 | 9/2010 | Gabrielov et al. |
| 2011/0154721 A1 | 6/2011 | Chheda et al. |
| 2011/0167713 A1 | 7/2011 | Quignard et al. |
| 2012/0152836 A1 | 6/2012 | Powell et al. |
| 2012/0156743 A1 | 6/2012 | Powell et al. |
| 2012/0282465 A1 | 11/2012 | Kadam et al. |
| 2012/0317872 A1 | 12/2012 | Powell et al. |
| 2013/0109896 A1 | 5/2013 | Powell et al. |
| 2013/0145683 A1 | 6/2013 | Freel et al. |
| 2013/0331623 A1 | 12/2013 | Elliott et al. |
| 2014/0000154 A1 | 1/2014 | Powell |
| 2014/0117276 A1 | 5/2014 | Powell et al. |

METHODS AND SYSTEMS FOR PROCESSING A REACTION PRODUCT MIXTURE OF CELLULOSIC BIOMASS MATERIAL

RELATED APPLICATION

This application claims priority to U.S. Provisional Application No. 61/919,221, filed on Dec. 20, 2013, the disclosure of which is incorporated herein by reference in its entirety.

TECHNICAL FIELD

The present disclosure generally relates to methods and systems for processing a reaction product mixture of cellulosic biomass material. Specifically, the present disclosure relates to combusting at least a portion of a fraction of the reaction product mixture to generate heat that can be used to vaporize at least one organic compound in that fraction.

BACKGROUND

This section is intended to introduce various aspects of the art, which may be associated with exemplary embodiments of the present invention. This discussion is believed to assist in providing a framework to facilitate a better understanding of particular aspects of the present invention. Accordingly, it should be understood that this section should be read in this light, and not necessarily as admissions of any prior art.

A number of substances of commercial significance may be produced from natural sources, including biomass. Cellulosic biomass may be particularly suitable in this regard due to the versatility of the abundant carbohydrates found therein in various forms. As used herein, the term "cellulosic biomass" refers to a living or formerly living biological material that contains cellulose. The lignocellulosic material found in the cell walls of plants is one of the world's largest sources of carbohydrates. Materials commonly produced from cellulosic biomass may include, for example, paper and pulpwood via partial digestion, biofuels, including bioethanol by fermentation.

Development of fossil fuel alternatives derived from renewable resources have received recent attention. Cellulosic biomass has garnered particular attention in this regard due to its abundance and the versatility of the various constituents found therein, particularly cellulose and other carbohydrates. Conversion of cellulosic biomass into fuel blends and other materials typically involve extraction of cellulose and other complex carbohydrates and transformation into simpler organic molecules for further processing, including digestion processes. The processing of the cellulose biomass typically produces an intermediate liquor that contains a mixture of products, including desirable organic molecules, as well as other compounds such as lignin and/or other related products. The desirable organic molecules are typically separated for further reactions to produce fuels while other components are handled separately.

There are existing methods to process the more challenging components of the intermediate liquor, which typically include lignin and/or other related products. One typical method uses solvents or other chemicals. In such a process, complex equipment is typically required and is expensive to operate because of the solvent or chemical usage. Further, separation and filtration of these other compounds, which typically include lignin and/or other related products, following solvent removal typically create engineering issues in the transportation of these other components to where they can be disposed, which is typically a burning facility. In other existing processes, the solid conversion of lignocellulosic biomass in pre-treatment (fractionation) and cellulose hydrolysis requires high temperatures and appropriate solvation properties to fully or partially solubilize lignin and/or related products present. Upon cooling, certain lignin and/or related compounds precipitate from solution. The particle size of the recovered lignin and/or related products may be variable and too large for efficient burning, thus requiring a separate pulverizing step. Furthermore, as the mixture containing lignin and/or related compounds in solution cools, it becomes sticky (typically in the glass transition temperature range of lignin and/or related products, which is about 100° C. under ambient pressure) and tends to foul the process equipment to the point of making the process inoperable.

As evidenced by the foregoing, the efficient processing of a reaction product mixture of cellulosic biomass is a complex problem that presents immense engineering challenges. Embodiments provided by the present disclosure address these challenges and provide related advantages as well.

SUMMARY

According to one aspect, the present disclosure provides a system comprising a digestion unit adapted to digest a cellulosic biomass material to generate a digested product comprising at least one soluble carbohydrate; a separation zone adapted to separate the digested product into a bottom fraction and an overhead fraction; and a recovery unit. The bottom fraction comprises (i) at least one compound having a separation point having a temperature in a range of about 100 to 600 degrees C. and a pressure of about atmospheric pressure and (ii) at least one a volatile organic compound. The recovery unit comprises a heat exchange component adapted to transfer thermal energy between the bottom fraction and a thermal exchange fluid; and a furnace component coupled to a first outlet of the heat exchange component to receive the bottom fraction from the heat exchange component. The thermal energy transfer energy between the bottom fraction and the thermal exchange fluid facilitates vaporization of the at least one volatile organic compound in the bottom fraction to generate an overhead product, which can exit the heat exchange component via a second outlet of the heat exchange component. The furnace component is adapted to combust at least a portion of the bottom fraction to generate at least a portion of the thermal exchange fluid. In one embodiment, the bottom fraction comprises at least one of lignin, a lignin-derived compound, unextracted cellulose, unextracted hemicellulose, a caramelan, and any combination thereof.

In one embodiment, the heat exchange component comprises a shell and tube heat exchanger. In another embodiment, the heat exchange component is disposed in the furnace component. In yet another embodiment, the heat exchange component is positioned above a combustion zone of the furnace component. In one embodiment, the furnace component further comprises a port to allow an oxygen containing fluid to enter for combustion. In another embodiment, the furnace component further comprises at least one tube-lined wall. In yet another embodiment, the furnace component comprises an atomizing burner.

In one embodiment, the system further comprises a processing zone coupled to the separation zone, the processing zone configured to convert at least a portion of a plurality of hydrocarbon and oxygenated hydrocarbon molecules in the overhead fraction to a product stream comprising a higher hydrocarbon. In one embodiment, an outlet of the recovery unit adapted to discharge at least a portion of the overhead product is coupled to an inlet of the processing zone.

In one embodiment, the system further comprises an economizer component adapted to preheat at least a portion of the bottom fraction. In another embodiment, the system further comprises a superheater adapted to increase the temperature of at least a portion of the bottom fraction in the heat exchange component. In yet another embodiment, the system further comprises a hydrocatalytic system disposed between the digestion unit and the separation zone. In one embodiment, the overhead product comprises at least one oxygenated hydrocarbon molecule.

In one embodiment, the bottom fraction comprises at least one compound having a separation point having a temperature in a range of about 100 to 500 degrees C. and a pressure in a range of about 1 to 100 Torr, preferably about 3 to 20 Torr, such as about 10 Torr. In one embodiment, the heat exchange component is configured to apply a temperature in a range of 100 to 600 degrees C. and a pressure in a range of 0.01 to 250 psi, preferably about 0.05 to 150 psi, to the bottom fraction. In another embodiment, the heat exchange component is configured to provide multistage distillation of the bottom fraction.

According to another aspect, the present disclosure provides a method comprising providing a biomass feedstock containing cellulose and water; digesting at least a portion of the biomass feedstock to generate a digested product comprising at least one soluble carbohydrate; separating the digested product into at least a bottom fraction and an overhead fraction. The bottom fraction comprises (i) at least one compound having a separation point having a temperature in a range of about 100 to 600 degrees C. and a pressure of about atmospheric pressure and (ii) at least one volatile organic compound. The method further comprises vaporizing the at least one volatile organic compound using at least a thermal exchange fluid, and combusting at least a portion of the bottom fraction without the vaporized at least one compound to generate at least a portion of the thermal exchange fluid. In one embodiment, the bottom fraction comprises at least one of lignin, a lignin-derived compound, unextracted cellulose, unextracted hemicellulose, a caramelan, and any combination thereof.

Other features of embodiments provided by the present disclosure will become apparent from the following detailed description. It should be understood, however, that the detailed description and the specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, as will occur to one having ordinary skill in the art and the benefit of this disclosure.

DETAILED DESCRIPTION

Figure 1:
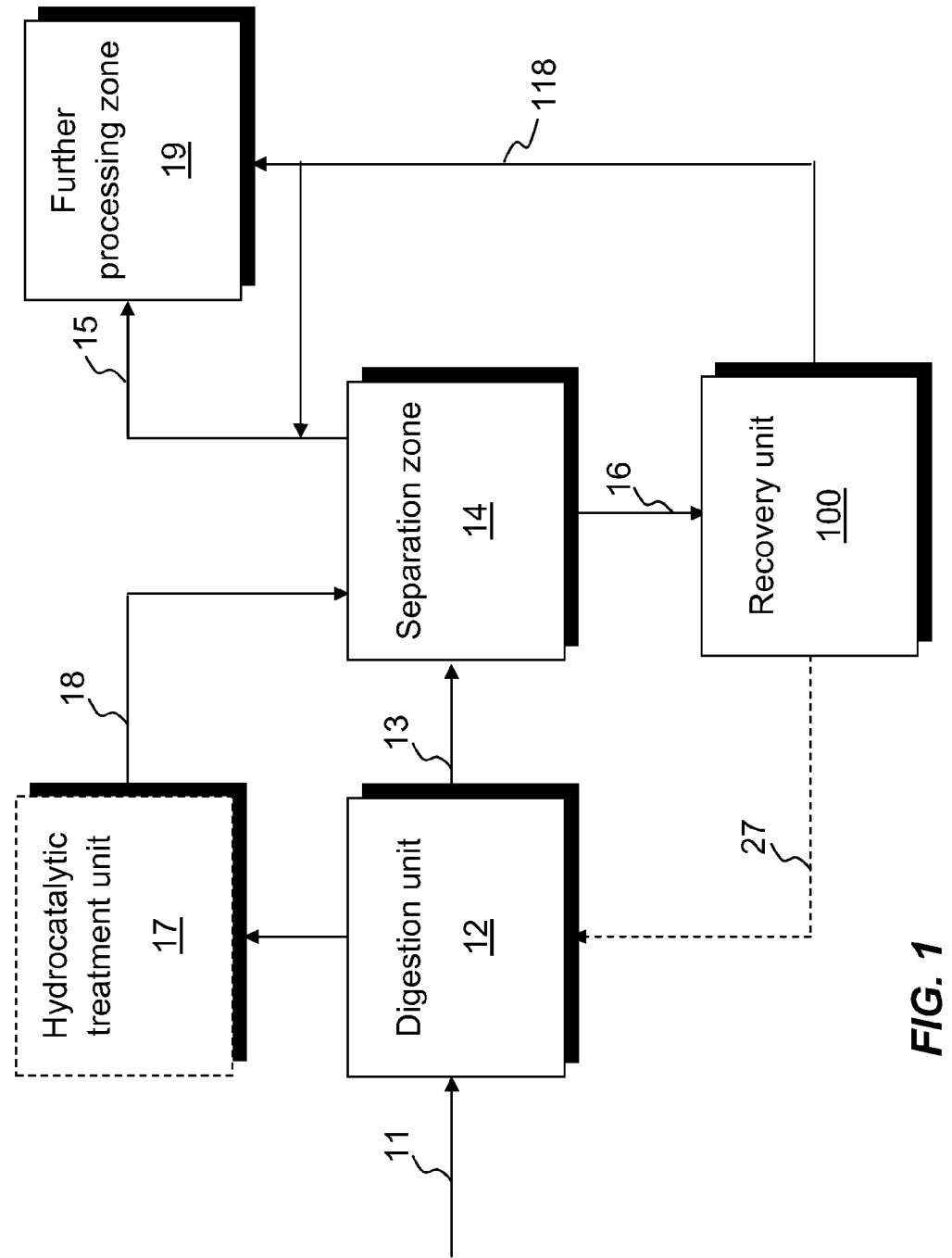
FIG. 1 is a schematic of an exemplary embodiment of a recovery system according to aspects provided by the present disclosure.

Various embodiments described in this disclosure provide for systems and methods for processing of a reaction product mixture containing volatile organic compounds as well as at least one of lignin, a lignin-derived compound, unextracted cellulose, unextracted hemicellulose, a caramelan, and any combination thereof, by vaporizing at least a portion of the volatile organic compounds using thermal energy generated by combusting at least a portion of reaction product mixture. The volatile organic compounds can be collected for further processing. The portion of the reaction product mixture combusted is preferably a bottom fraction. Various embodiments described in this disclosure also provide for a system that allows for processing of a reaction product mixture containing volatile organic compounds as well as at least one of lignin, a lignin-derived compound, unextracted cellulose, unextracted hemicellulose, a caramelan, and any combination thereof, via combustion of at least a portion of the product mixture while removing at least a portion of the volatile organic compounds via vaporization using thermal energy generated by the combustion. As used herein, the terms "combust," "combustion" and "combustible" refer to complete or substantially complete combustion involving an oxidation process that converts a carbonaceous material to a product mixture consisting substantially of carbon dioxide and steam.

The reaction product mixture can come from any suitable source. In a particular embodiment, the reaction product mixture comes from reactions involving deconstruction (or digestion) of biomass, particularly cellulosic biomass which contains various polysaccharides (e.g., carbohydrates) and lignin. The term "cellulosic biomass" refers at least to a living or formerly living biological material that contains cellulose. Applicable reactions include hydrolysis reactions that convert or break down certain larger carbohydrate compounds to more desired compounds for subsequent processing. Exemplary reactions include digestion, pulping solvation, and thermocatalytic conversion of cellulosic biomass.

Various materials can be produced from cellulosic biomass material, including but not limited to biofuels. Production of biofuels often require digestion of the cellulosic biomass, including cellulose and other complex carbohydrates, to generate soluble carbohydrates for further processing into the desired product. The term "soluble carbohydrates" refers at least to monosaccharides or polysaccharides that become solubilized in a digestion process. Subsequent processing of the soluble carbohydrates typically produces a fluid that contains desirable organic molecules, such as volatile organic compounds, as well as lignin and other by-products. The desirable organic molecules are recovered for further processing to produce the final product, such as higher molecular weight hydrocarbons. In certain digestion processes, lignin and/or other related products in a reaction product mixture of cellulosic biomass material often pose a challenge as mentioned above. In addition, other higher molecular weight oligomers can be derived from further processing (e.g., condensation) of soluble carbohydrates, either reacting with themselves, lignin, or components derived from the partial depolymerization of lignin. These higher molecular weight oligomers form one or more heavy ends that are nonvolatile, which contribute to the overall concept of a "lignin" or heavy ends phase that are processed by various embodiments provided by this disclosure.

Various exemplary embodiments of the invention are further described with reference to the drawings. When like elements are used in one or more figures, identical reference characters will be used in each figure, and a detailed description of the element will be provided only at its first occurrence. Some features of the embodiments may be omitted in certain depicted configurations in the interest of clarity. Moreover, certain features such as, but not limited to, pumps, valves, gas bleeds, gas inlets, fluid inlets, fluid outlets and the like have not necessarily been depicted in the figures, but their presence and function will be understood by one having ordinary skill in the art.

Referring to FIG. 1, biomass feedstock 11 is provided to digestion unit 12 where biomass feedstock 11 is contacted with a digestive media or solvent to further process biomass feedstock 11 into product mixture 13 comprising fully and/or partially hydrolyzed biomass. In one embodiment (not shown), product mixture 13 may be further processed, such as in further processing zone 19, to produce chemicals and/or biofuels. Digestion unit 12 is coupled to separation zone 14 to provide product mixture 13 to separation zone 14. In one embodiment, digestion unit 12 is in fluid communication with separation zone 14. As shown, at least a portion of product mixture 13 is separated or fractionated in separation zone 14 into at least two fractions: overhead fraction 15 and bottom fraction 16. At least a portion of bottom fraction 16 is routed to recovery unit 100 where at least a portion of bottom fraction 16 is combusted to generate heat that is used to vaporize one or more volatile organic compounds (VOCs) in bottom fraction 16.

At least a portion of one or more vaporized VOCs in bottom fraction 16 exits recovery unit 100 as overhead product 118, which can be fed directly into further processing zone 19 separately and/or combined with overhead fraction 15 prior to entering further processing zone 19. In another embodiment, recovery unit 100 is coupled to digestion unit 12 to provide digestion unit 12 with steam from recovery unit 100 via stream 27.

Any suitable type of biomass can be used as biomass feedstock 11. Suitable cellulosic biomass sources may include, for example, forestry residues, agricultural residues, herbaceous material, municipal solid wastes, waste and recycled paper, pulp and paper mill residues, and any combination thereof. Thus, in some embodiments, a suitable cellulosic biomass may include, for example, corn stover, straw, bagasse, miscanthus, sorghum residue, switch grass, bamboo, water hyacinth, hardwood, hardwood chips, hardwood pulp, softwood, softwood chips, softwood pulp, duckweed, and any combination thereof. Leaves, roots, seeds, stalks, husks, and the like may be used as a source of the cellulosic biomass. Common sources of cellulosic biomass may include, for example, agricultural wastes (e.g., corn stalks, straw, seed hulls, sugarcane leavings, nut shells, and the like), wood materials (e.g., wood or bark, sawdust, timber slash, mill scrap, and the like), municipal waste (e.g., waste paper, yard clippings or debris, and the like), and energy crops (e.g., poplars, willows, switch grass, alfalfa, prairie bluestream, corn, soybeans, and the like). The cellulosic biomass may be chosen based upon considerations such as, for example, cellulose and/or hemicellulose content, lignin content, growing time/season, growing location/transportation cost, growing costs, harvesting costs, and the like.

Biomass feedstock 11 may be natively present in any sizes, shapes, or forms, or it may be further processed prior to entering digestion unit 12. Examples of further processing include washing (such as, with water, an acid, a base, combinations thereof, and the like), torrefaction, liquefaction, such as pyrolysis, or reduction in size. In some embodiments, the reduction in size may include chipping, chopping, grounding, shredding, pulverizing, and the like to produce a desired size. Thus, in some embodiments, providing a biomass material can comprise harvesting a lignocelluloses-containing plant such as, for example, a hardwood or softwood tree. The tree can be subjected to debarking, chipping to wood chips of desirable thickness, and washing to remove any residual soil, dirt and the like.

In a preferred embodiment, overhead fraction 15 comprises compounds having a vaporization point that is lower than that of bottom fraction 16, and bottom fraction 16 comprises compounds having a separation point having a temperature in a range of about 100 to 600 degrees C. and a pressure of about atmospheric pressure, more preferably a temperature in a range of about 100 to 500 degrees C. and a pressure in a range of about 1 to 100 Torr, preferably about 3 to 20 Torr, such as about 10 Torr; and most preferably a temperature in a range of about 200 to 450 degrees C. and a pressure in a range of about 1 to 100 Torr, preferably about 3 to 20 Torr, such as about 10 Torr. As used herein, a "separation point" refers to a temperature and pressure at or above which a component does not become a vapor or gas. For example, bottom fraction 16 comprises (i) at least one compound having a separation point having a temperature in a range of about 100 to 600 degrees C. and a pressure of about atmospheric pressure and (ii) at least one a volatile organic compound. In this instance, the at least one compound having the recited separation point does not become a vapor or gas, e.g., vaporize, at or above about 100 to 600 degrees C. and a pressure of about atmospheric pressure. Overhead fraction 15 comprises compounds that would vaporize at a temperature in a range about 100 to 600 degrees C. and pressure of about atmospheric pressure, more preferably a temperature in a range of about 100 to 500 degrees C. and about 1 to 100 Torr, preferably about 3 to 20 Torr; most preferably a temperature in a range of about 200 to 450 degrees C. and about 1 to 100 Torr, preferably about 3 to 20 Torr. It is understood that components or compounds in bottom fraction 16 may degrade or convert into different compounds at a separation point. Compounds in overhead fraction 15 can be referred to as light components while compounds in bottom fraction 16 can be referred to as heavy components or heavy ends. Overhead fraction 15 can be further processed into chemicals and/or biofuels, such as in further processing zone 19. In one embodiment, bottom fraction 16 comprises at least one of lignin, a lignin-derived compound, unextracted cellulose, unextracted hemicellulose, a caramelan, and other high molecular weight carbonaceous compounds derived from adverse reactions of carbohydrates, sugars, and lignin-derived species. Non-limiting exemplary lignin-derived compounds can include partially depolymerized lignin moieties containing 5-'5, phenylcoumaran, and β-O-4 linkages as characterized by monomeric compounds, phenol, o-cresol, p-cresol, anisole, 4-methylanisole, catechol, guaiacol, 4-methylguaiacol, 1,3-dimethoxybenzene, syringol, and vanillin. Other derived compounds include methanol, methoxyphenol, methyl phenol, dimethyl phenol, ethyl phenol, methyl ethyl phenol, methoxypropylphenol, benzene diol, propyl phenol, and similar compounds. Bottom fraction 16 can further comprise oligomeric derivatives of carbohydrates, and intermediates, including phenolic intermediates derived from lignin, unreacted or partially hydrolyzed cellulose and hemicellulose, cellulose condensation products, caramelans, and cross polymerization products of sugars and phenolic intermediates.

In a preferred embodiment, a digestion reaction takes place in digestion unit 12. Any suitable digestion process that forms a pretreated biomass containing soluble carbohydrates may be used. Examples of suitable digestion processes can be found in U.S. Application Publication Nos. US 2012/0152836, and US 2012/0156743, the disclosure of each is incorporated herein by reference in its entirety. In digestion unit 12, biomass feedstock 11 is contacted with a digestive solvent in at least one digester where the digestion reaction takes place.

In one embodiment, a digestive solvent used in digestion unit 12 can comprise an organic solvent that is at least partially water miscible and has partial solubility in water, preferably greater than 2 weight percent in water. In one such embodiment, the digestive solvent is a water-organic solvent mixture with optional inorganic acid promoters such as HCl or sulfuric acid. Oxygenated solvents exhibiting full or partial water solubility are preferred digestive solvents. In such a process, the organic digestive solvent mixture can be, for example, methanol, ethanol, acetone, ethylene glycol, triethylene glycol and tetrahydrofurfuryl alcohol. Organic acids such as acetic, oxalic, acetylsalicylic and salicylic acids can also be used as catalysts (as acid promoter) in the at least partially miscible organic solvent process. Temperatures for the digestion may range from about 130 to about 300 degrees Celsius, preferably from about 140 to 250 degrees Celsius, and contact times from 0.25 to 24 hours, preferably from about one to 4 hours. Preferably, a pressure from about 250 kPa to 13000 kPa, and most typically from 700 to 10000 kPa, maintained on the system to avoid boiling or flashing away of the solvent.

In another embodiment, at least a portion of product mixture 13 generated in digestion unit 12 can be optionally further subject to a catalytic reduction reaction in hydrocatalytic treatment unit 17 where product mixture 13 is reacted with hydrogen in the presence of a metal catalyst capable of activating molecular hydrogen to form hydrocatalytically treated mixture 18 comprising a plurality of hydrocarbons, including oxygenated hydrocarbon molecules, which can be further processed to form other desired compounds, such as biofuels components.

For embodiments that facilitate conversion of biomass 11 to an eventual fuel component, subjecting product mixture 13 to one or more catalytic reduction reactions, such as that which take place in hydrocatalytic treatment unit 17 including hydrogenation and/or hydrogenolysis reactions, protects at least a portion of soluble carbohydrates in product mixture 13 from thermal degradation, thereby allowing further processing of such carbohydrates into desired components. While suitable for further transformation, soluble carbohydrates can be very reactive and can rapidly degrade to produce caramelans and other degradation products, especially under higher temperature conditions, such as above about 15° degrees C. Depending on the reaction conditions and catalyst used, reaction products formed as a result of conducting one or more catalytic reduction reactions on soluble carbohydrates may comprise, as mentioned, oxygenated hydrocarbon molecules, including one or more alcohol functional groups, particularly including triols, diols, monohydric alcohols, and any combination thereof, some of which may also include a residual carbonyl functionality (e.g., an aldehyde or a ketone). As used herein, the term "hydrocarbons" refers to compounds containing both carbon and hydrogen without reference to other elements that may be present. Thus, heteroatom-substituted compounds are also described herein by the term "hydrocarbons." The term "hydrocatalytic treatment" refers to a type of thermocatalytic reaction where the reaction is with hydrogen in the presence of a catalyst capable of activating molecular hydrogen, preferably a metal catalyst.

Descriptions of exemplary digestion and catalytic reduction reactions and corresponding systems can be found in U.S. Application Publication Nos. US2012/0152836, US2012/0156743, and US2011/0154721, the entire content of each is hereby incorporated by reference. For example, digestion unit 12 of FIG. 1 of the present disclosure can comprise digestion 106 shown in FIGS. 1-5 of US2012/0152836, and hydrocatalytic treatment unit 17 of FIG. 1 of the present disclosure can comprise hydrogenolysis system 126 shown in FIGS. 1-5 of US2012/0152836. In another embodiment, hydrocatalytic treatment unit 17 can comprise any combination of hydrogenolysis systems 126, 126A, 126B, and 126C shown in FIGS. 1-5 of US2012/0152836. In one embodiment, digestion unit 12 can comprise pretreat system 104 and/or treatment system 110 shown in FIGS. 1-2 of US2012/0156743, and hydrocatalytitc treatment unit 17 can comprise hydrogenolysis system 120 shown in FIGS. 1-2 of US2012/0156743. In yet another example, digestion unit 12 of FIG. 1 of the present disclosure can comprise hydrolysis reaction 114 of FIG. 3 of US2011/0154721, and hydrocatalytic treatment unit 17 can comprise hydrogenation reaction 104 and/or hydrogenolysis reaction 106 of FIGS. 1, 2, and/or 3 of US2011/0154721. The descriptions of reactions and systems of U.S. Application Publication Nos. US2012/0152836, US2012/0156743, and US2011/0154721 have already been incorporated by reference in their entirety, and thus need not be repeated.

As shown in FIG. 1 of the present disclosure, at least a portion of hydrocatalytically treated mixture 18 exiting hydrocatalytic treatment unit 17 can be routed to separation zone 14 to separate hydrocatalytically treated mixture 18 and/or product mixture 13 into at least overhead fraction 15 and bottom fraction 16, which can be routed to recovery unit 100 for processing as described herein. It is understood that the hydrocatalytic treatment that takes place in hydrocatalytic treatment unit 17 can employ aqueous phase and/or organic phase solvents. For example, US2011/0154721, US2012/0152836, and US2012/0156743 provide examples of hydrocatalytic treatment that occurs in aqueous phase. Exemplary descriptions of a hydrocatalytic treatment that takes place in an organic phase can be found in U.S. Application Publication No. US2013/0109896, the disclosure of which is hereby incorporated by reference in its entirety.

Figure 2:
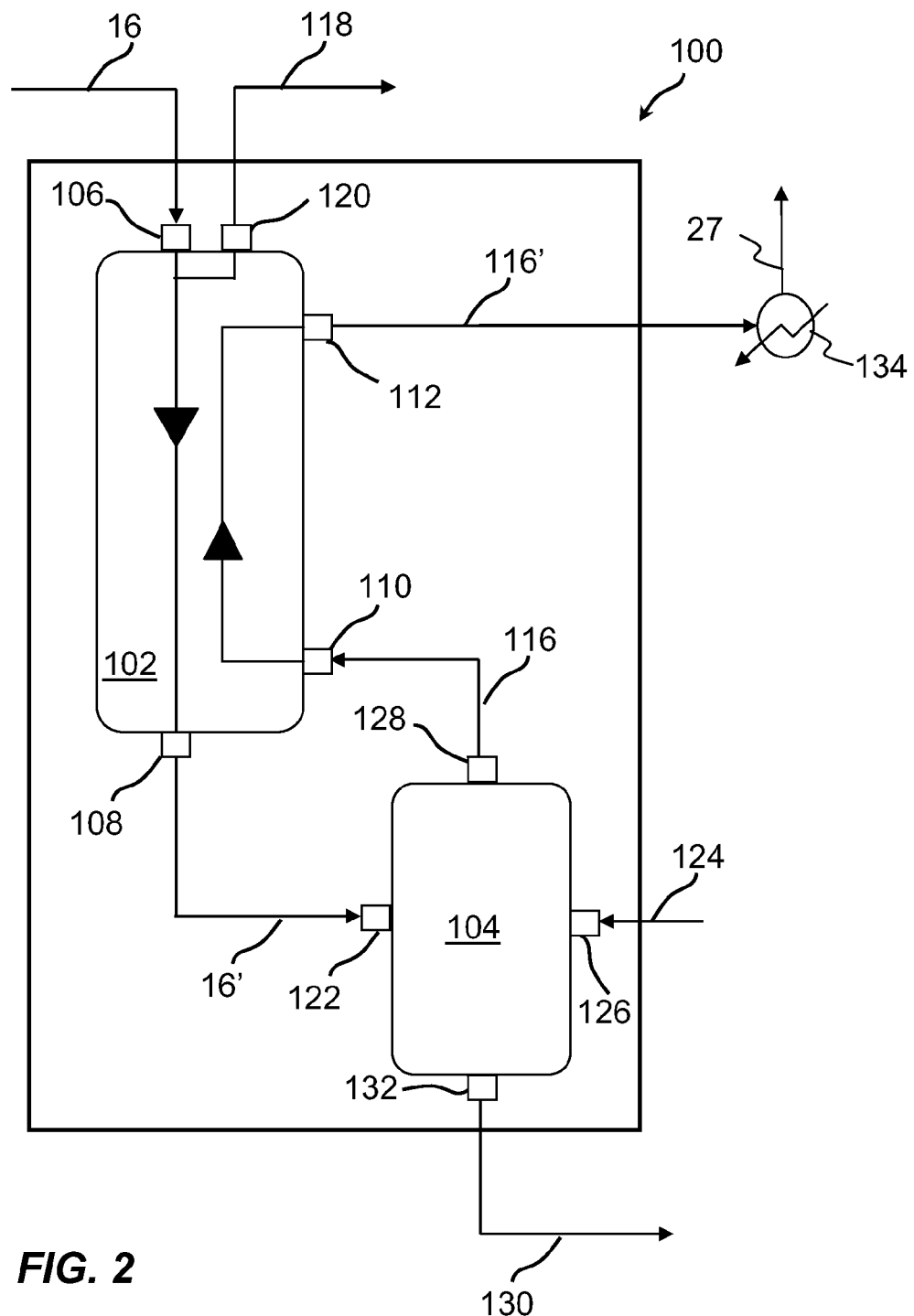
FIG. 2 is a schematic of an exemplary embodiment of a recovery unit according to aspects provided by the present disclosure.

In one embodiment, digestion unit 12 of FIG. 1 of the present disclosure can comprise digestion system 10 of FIGS. 1 and 2 of US2013/0109896, and hydrocatalytic treatment system 17 can comprise organic phase hydrocatalytic treatment system 20 shown in FIG. 1 of US2013/0109896. The descriptions corresponding to digestive system 10 and organic phase hydrocatalytic treatment system 20 are provided by US2013/0109896, which is incorporated by reference in its entirety, and thus need not be repeated. In such embodiments, at least a portion of organic hydrocarbon-rich phase stream 32 shown in FIG. 1 of US2013/0109896 can be routed to separation zone 14 shown in FIG. 1 of this disclosure, to separate organic hydrocarbon-rich phase stream 32 into overhead fraction 15 and bottom fraction 16, which can be processed by recovery unit 100 as described herein. In one embodiment, the liquid-liquid separation 30 in FIG. 1 of US2013/0109896 can be part of separation zone 14. That is, separation zone 14 can comprise the liquid-liquid separation 30 in FIG. 1 of US2013/0109896. For example, in one embodiment, separation zone 14 comprises a liquid-liquid separation step, such as that described in US2013/0109896, which provides bottom fraction 16, which can be routed to recovery unit 100. In addition to or as an alternative, in one embodiment, the liquid-liquid separation step provides an organic hydrocarbon-rich phase that is further separated in separation zone 14 to provide bottom fraction 16.

In one embodiment, digestion unit 12 of FIG. 1 of the present disclosure can comprise digestion system 10 of FIGS. 1 and 2 of US2013/0109896, and hydrocatalytic treatment system 17 can comprise organic phase hydrocatalytic treatment system 20 shown in FIG. 1 of US2013/0109896. The descriptions corresponding to digestive system 10 and organic phase hydrocatalytic treatment system 20 are provided by US2013/0109896, which is incorporated by reference in its entirety, and thus need not be repeated. In such embodiments, at least a portion of organic hydrocarbon-rich phase stream 32 shown in FIG. 1 of US2013/0109896 can be routed to separation zone 14 shown in FIG. 1 of this disclosure, to separate organic hydrocarbon-rich phase stream 32 into overhead fraction 15 and bottom fraction 16, which can be processed by recovery unit 100 as described herein. In one embodiment, the liquid-liquid separation 30 in FIG. 1 of US2013/0109896 can be part of separation zone 14. That is, separation zone 14 can comprise the liquid-liquid separation 30 in FIG. 1 of US2013/0109896. For example, in one embodiment, separation zone 14 comprises a liquid-liquid separation step, such as that described in US2013/0109896, which provides bottom fraction 16, which can be routed to recovery unit 100. In addition to or as an alternative, in one embodiment, the liquid-liquid separation step provides an organic hydrocarbon-rich phase that is further separated in separation zone 14 to provide bottom fraction 16.

In yet another embodiment, digestion unit 12 comprises hydrothermal digestion, particularly as described in U.S. Application Publication Nos. 61/665,641, filed on Jun. 28, 2012, 61/720,757, filed on Oct. 31, 2012, and 61/817,996, filed on May 1, 2013, the disclosures of which are hereby incorporated by reference in their entirety.

For example, in one embodiment, digestion unit 12 of FIG. 1 of the present disclosure can comprise hydrothermal digestion unit 2 shown in FIG. 1 of U.S. Application No. 61/665,641. In another embodiment, if hydrocatalytic treatment unit 17 is employed, it can comprise catalytic reduction reactor unit 4 shown in FIG. 1 of U.S. Application No. 61/665,641. The descriptions corresponding to hydrothermal digestion unit 2 and catalytic reduction reactor unit 4 are provided by U.S. Application No. 61/665,641, which is incorporated by reference in its entirety, and thus need not be repeated. Further, in one embodiment, phase separation mechanism 26 in FIG. 1 of U.S. Application No. 61/665,641 can be part of separation zone 14 of FIG. 1 of the present disclosure. That is, separation zone 14 can comprise phase separation mechanism 26 in FIG. 1 of U.S. Application No. 61/665,641 that provides bottom fraction 16 which can be routed to recovery unit 100. In addition to or alternatively, in one embodiment, phase separation mechanism 26 in FIG. 1 of U.S. Application No. 61/665,641 provides an organic phase that is further separated in separation zone 14 to provide bottom fraction 16.

In another embodiment, digestion unit 12 of FIG. 1 of the present disclosure can comprise at least one of hydrothermal digestion unit 2 shown in FIG. 1 of U.S. Application No. 61/720,757. In another embodiment, if hydrocatalytic treatment unit 17 is employed, it can comprise polishing reactor 16 shown in FIG. 1 of U.S. Application No. 61/720,757, where one or more catalytic reduction reactions can further take place to protect soluble carbohydrates from thermal degradation as described. The descriptions corresponding to hydrothermal digestion unit 2 and polishing reactor 16 are provided by U.S. Application No. 61/720,757, which is incorporated by reference in its entirety, and thus need not be repeated. In such embodiments, at least a portion of lignin removal line 18 shown in FIG. 1 of U.S. Application No. 61/720,757 can be routed to separation zone 14 shown in FIG. 1 of the present disclosure, to provide bottom fraction 16. In addition to or alternatively, in embodiments comprising polishing reactor 16 shown in FIG. 1 of U.S. Application No. 61/720,757, at least a portion of the product stream exiting polishing reactor 16 can be routed to separation zone 14 shown in FIG. 1 of the present disclosure to provide a bottom fraction 16, which can be routed to recovery unit 100 as described. That is, an input to separation zone 14 can include a product from hydrothermal digestion unit 2 and/or polishing reactor 16 of U.S. Application No. 61/720,757.

In yet another embodiment, digestion unit 12 of FIG. 1 of the present disclosure can comprise hydrothermal digestion unit 2 and polishing reactor 16 shown in FIGS. 1-12 of U.S. Application No. 61/817,996. In another embodiment, if hydrocatalytic treatment unit 17 is employed, it can comprise polishing reactor 16 shown in FIGS. 1-12 of U.S. Application No. 61/817,996, where one or more catalytic reduction reactions can further take place to protect soluble carbohydrates from thermal degradation as described. The descriptions corresponding to hydrothermal digestion unit 2 and polishing reactor 16 are provided by U.S. Application No. 61/817,996, which is incorporated by reference in its entirety, and thus need not be repeated. In such embodiments, at least a portion of lignin removal line 18 shown in FIGS. 1-12 of U.S. Application No. 61/817,996 can be routed to separation zone 14 shown in FIG. 1 of the present disclosure to provide bottom fraction 16. In addition to or alternatively, in embodiments comprising polishing reactor 16 shown in FIGS. 1-12 of U.S. Application No. 61/817,996, at least a portion of the product stream exiting polishing reactor 16 can be routed to separation zone 14 shown in FIG. 1 to provide bottom fraction 16. That is, an input to separation zone 14 can include a product from hydrothermal digestion unit 2 and/or polishing reactor 16 of U.S. Application No. 61/817,996. In one embodiment, separations unit 32 in FIGS. 1-12 of U.S. Application No. 61/817,996 can be part of separation zone 14. That is, separation zone 14 can comprise separations unit 32 in FIGS. 1-12 of U.S. Application No. 61/817,996 that provides bottom fraction 16 which can be routed to recovery unit 100. In addition to or alternatively, in one embodiment, separations unit 32 in FIGS. 1-12 of U.S. Application No. 61/817,996 provides a portion that is further separated in separation zone 14 to provide bottom fraction 16.

Referring to FIG. 1 of the present disclosure, at least a portion of product mixture 13 formed in digestion unit 12 and/or hydrocatalytically treated mixture 18 from hydrocatalytic system 17 is routed to separation zone 14 where mixture 13 and/or 18 can be separated into different components that can be further processed accordingly. In a preferred embodiment, at least a portion of mixture 13 and/or 18 is separated in separation zone 14 into at least two fractions: overhead fraction 15 and bottom fraction 16. In one embodiment, separation zone 14 can comprise a phase separator, a stripping column, an extractor, a filter, a distillation column, a flasher, or any combination thereof.

In a preferred embodiment, separation zone 14 separates mixture 13 and/or 18 into various components based on the volatility property (or separation point) of the compounds in mixture 13 and/or 18 under various temperature and pressure conditions. For example, a temperature in a range of about 100 to 600 degrees C. and a pressure of about atmospheric pressure, more preferably a temperature in a range of about 100 to 500 degrees C. and a pressure in a range of about 1 to 100 Torr, preferably about 3 to 20 Torr, such as 10 Torr; most preferably a temperature in a range of about 200 to 450 degrees C. and a pressure in a range of about 1 to 100 Torr, preferably about 3 to 20 Torr, such as 10 Torr, can be applied to at least a portion of mixture 13 and/or 18. In one embodiment, compounds that vaporize under these conditions become overhead fraction 15, and compounds that do not vaporize remain to form bottom fraction 16. The temperature and pressure can be applied gradually in a continuous or step-wise manner or rapidly as desired or according to operating conditions, using suitable techniques known to those skilled in the art, such as those employed in distillation columns. The temperature and pressure can be applied for any suitable duration. Such manners of applying temperature and pressure to separate components based on vaporization properties are known to those skilled in the art. Examples of a suitable time period include about 1-60 minutes. Bottom fraction 16 preferably comprises at least one of lignin, a lignin-derived compound, unextracted cellulose, unextracted hemicellulose, a caramelan, and any combination thereof, such as partially depolymerized lignin moieties containing 5-'5, phenylcoumaran, and β-O-4 linkages as characterized by monomeric compounds phenol, o-cresol, p-cresol, anisole, 4-methylanisole, catechol, guaiacol, 4-methylguaiacol, 1,3-dimethoxybenzene, syringol, and vanillin. Other derived compounds include methanol, methoxyphenol, methyl phenol, dimethyl phenol, ethyl phenol, methyl ethyl phenol, methoxypropylphenol, benzene diol, propyl phenol, and similar compounds. In a preferred embodiment, bottom fraction 16 is a solid at ambient temperature and can flow at higher temperatures, such as greater than 100 degrees C. The viscosity of bottom fraction 16 preferably decreases with increasing temperature. In one embodiment, the viscosity of bottom fraction 16 at a temperature of about 75 degrees C. is preferably about 1 to 10,000 centipoise (cP), more preferably about 100 to 5,000 cP, most preferably about 500 to 1000 cP. As will be understood by those of ordinary skill in the art, the viscosity and therefore the pumpability of bottom fraction 16 from separation zone 14 can be affected by various factors, including temperature, pressure, concentration of various compounds in the particular bottom fraction, composition, diluents, if any are used, impurity levels, storage time. If the physical state of bottom fraction 16 is solid to viscous, or a semi-solid liquid, it can be heated to a temperature and/or the pressure suitable to render it sufficiently fluid to be pumped, as desired.

Referring to FIG. 1, at least a portion of bottom fraction 16 is routed to recovery unit 100 where it is combusted, or at least certain combustible components in bottom fraction 16 are combusted, to generate heat that is used to vaporize one or more VOCs in bottom fraction 16. At least a portion of one or more vaporized VOCs in bottom fraction 16 exits recovery unit 100 as overhead product 118, which can be fed directly into further processing zone 19 separately and/or combined with overhead fraction 15. In a preferred embodiment, bottom fraction 16 enters recovery system 100 as a liquid.

Recovery unit 100 can generate steam, which can be used in other processes. For example, as shown in FIG. 1, steam from recovery unit 100 can be routed to digestion unit 12, shown as stream 27, for use in any suitable manner known to one of ordinary skill in the art, such as a heating medium. For example, in one embodiment, recovery unit 100 is coupled to digestion unit 12 to provide digestion unit 12 with steam from recovery unit 100 via stream 27 as shown in FIG. 1. In a preferred embodiment, the steam contained in stream 27 is provided to digestion unit 12 at a pressure in a range of about 20-120 bar, more preferably about 40 to 100 bar, most preferably 40 to 90 bar. The steam can be saturated or with superheat. In one embodiment, steam from another source can be provided to digestion unit 12. In such an embodiment, stream 27 can be combined with steam from the boiler and the mixture of both can be provided as one stream or steam from the boiler and steam from recovery unit 100 can be provided separately.

Product mixture 13, overhead fraction 15 and/or overhead product 118 can be subject to further processing to produce a higher molecular weight compound. In one embodiment, the further processing takes place in processing zone 19 shown in FIG. 1. Non-limiting exemplary further processing methods include (i) reforming reactor 38 shown in FIGS. 1-12 of U.S. Application No. 61/817,996, (ii) reforming reactor 28 shown in FIG. 1 of U.S. Application No. 61/720,757, (iii) processing system 130 shown in FIGS. 1-2 of US2012/0156743, (iv) processing step 136 shown in FIGS. 1-5 of US2012/0152836; and processing reaction 110 shown in FIGS. 1-3 of US2011/0154721. In general, suitable further processing reactions include, but are not limited to, hydrogenolysis reactions, hydrogenation reactions, condensation reactions, isomerization reactions, oligomerization reactions, hydrotreating reactions, alkylation reactions, and any combination thereof.

FIG. 2 illustrates an exemplary embodiment of recovery unit 100. As shown, recovery unit 100 has heat exchange component 102 and furnace component 104. Heat exchange component 102 has inlet 106 and outlet 108 to accommodate movement of bottom fraction 16 therethrough. Likewise, heat exchange component 102 also includes inlet 110 and outlet 112 to accommodate the flow of heat exchange medium 116 therethrough. In one embodiment, bottom fraction 16 preferably enters recovery unit 100 as a fluid, e.g., having fluid-like properties. In one embodiment, bottom fraction 16 comprises (i) at least one compound having a separation point having a temperature in a range of about 100 to 600 degrees C. and a pressure of about atmospheric pressure and (ii) one or more volatile organic compounds. Heat exchange medium 116 preferably has a higher temperature than bottom fraction 16. Heat exchange component 102 is adapted to transfer thermal energy between bottom fraction 16 and heat exchange medium 116 to vaporize at least one volatile organic compound in bottom fraction 16 to produce overhead product 118. While FIG. 2 shows bottom fraction 16 flowing in the opposite direction as heat exchange medium 116, it is understood that bottom fraction 16 and heat exchange medium 116 can have the same flow direction in another embodiment. The vaporized organic compound(s) in overhead product 118 exit heat exchange component 102 through outlet 120 where it can be collected for further processing, such as that of further processing zone 19, as desired. In a particular embodiment, overhead product 118 includes at least one organic intermediates, such as an oxygenated intermediate, including one or more polyols, alcohols, ketones, mono-oxygenates, diols, and/or any other hydrocarbon having at least one oxygen atom. In certain embodiments where bottom fraction 16 comes from digestion of cellulosic material, particularly coming from a digester operating at higher temperatures, bottom fraction 16 also includes caramel, or caramelan, formed from heating sugars in the cellulosic biomass material. In one embodiment, this caramel is also combusted in furnace component 104 to generate heat exchange medium 116.

Referring to FIG. 2, as bottom fraction 16 moves through heat exchange component 102 from inlet 106 to outlet 108 and heat exchange medium 116 moves through heat exchange component 102 from inlet 110 to outlet 112, thermal energy is transferred from heat exchange medium 116 to bottom fraction 16, vaporizing at least one organic compound in bottom fraction 16. Heat exchange medium 116 exits heat exchange component 102 as fluid 116' at a lower temperature than when it entered heat exchange component 102. It is understood that residual heat in heat exchange medium 116' can be further garnered using means known to those skilled in the art. For example, steam can be generated by applying heat exchange medium 116' to steam generating superheater 134, which can comprise one or more conduits (not shown), such as tubes, containing water. When enough heat is transferred to the conduits, the water evaporates and becomes steam, which can be used as a heating medium for other parts of the process, such as routed to digestion unit 12 via stream 27. Yet another way of harnessing thermal energy 116 is to generate electricity using generated steam to turn a turbine (not shown) as known to those skilled in the art. Because a product of combustion is steam, this steam can be harnessed directly in similar manners described above or in other suitable manners known to those skilled in the art.

Referring to FIG. 2, bottom fraction 16 exits heat exchange component 102 as bottom fraction 16' at a higher temperature than when it entered heat exchange component 102. Bottom fraction 16' enters inlet 122 of furnace component 104 where at least a portion of bottom fraction 16' is combusted with oxygen containing fluid 124 entering port 126. In one embodiment, at least some lignin in bottom fraction 16' is combusted. The combustion of bottom fraction 16' generates primarily carbon dioxide and steam at high temperature, which exit furnace component 104 through outlet 128. As shown, the gases generated from the combustion in furnace component 104 enters heat exchange component 102 as heat exchange medium 116 through inlet 110. Thus, heat exchange medium 116 an at least include gases generated by combustion of lignin in bottom fraction 16'. Heat exchange medium 116 can also include other gases that carry thermal energy from sources other than from furnace component 104. Heat exchange medium 116 can be referred to as flue gas. Combustion residue 130, which contains materials not combusted, exits furnace component 104 through outlet 132.

Figure 3:
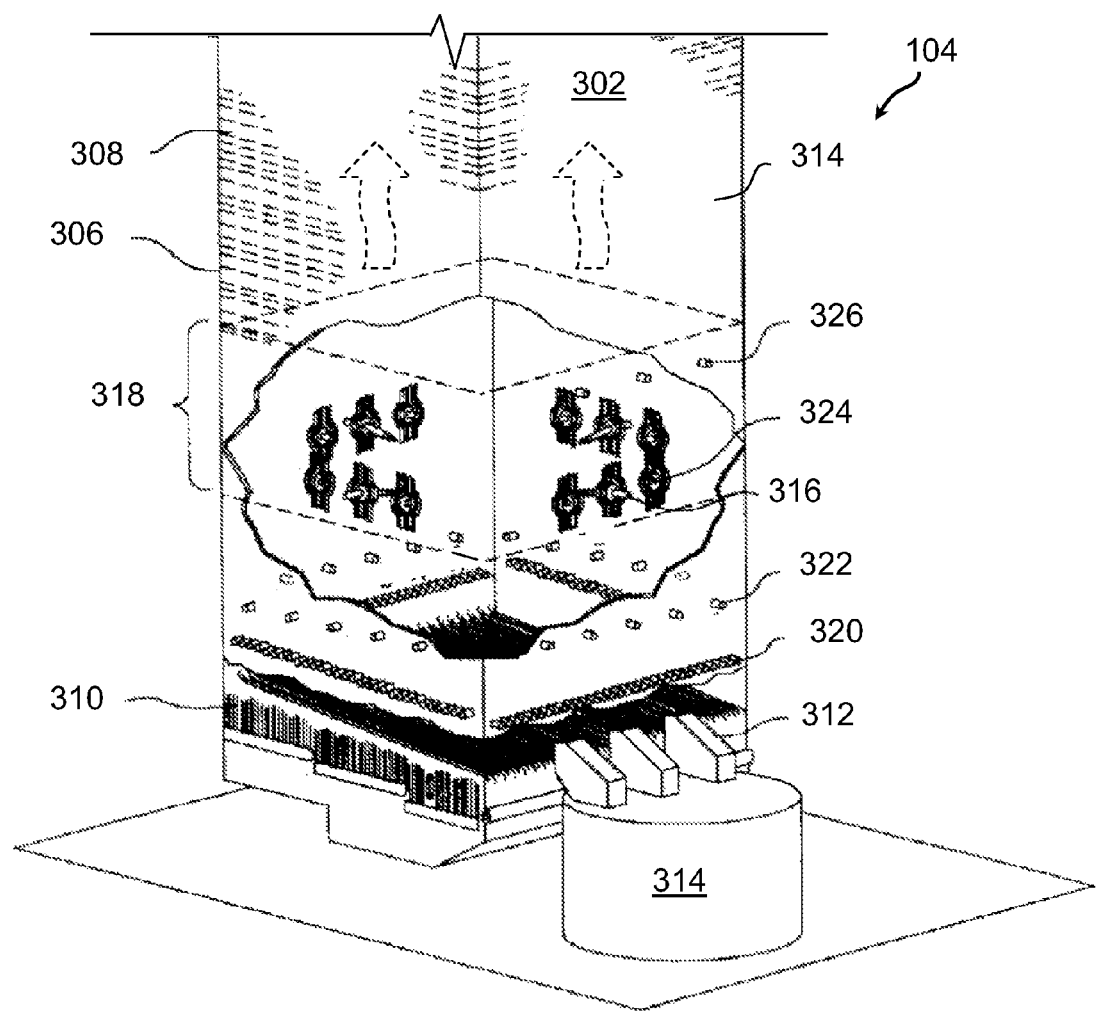
FIG. 3 is a schematic of an exemplary embodiment of a furnace component of a recovery unit according to aspects provided by the present disclosure.

FIG. 3 shows a particular embodiment of furnace component 104. In this embodiment, furnace component 104 includes furnace chamber 302 having front wall 304, rear wall 306, vertical side walls 308, and burner 310 near the bottom. Furnace component 104 has at least one combustion residue removal spout 312 for the discharge of combustion residue 130, such as ash components and/or slag, into collection tank 314. Furnace component 104 can have any number of combustion residue removal spout 312. For example, as shown in FIG. 3, there are three are combustion residue removal spouts 312.

Referring to FIG. 3, furnace component 104 further comprises at least one injection port 316 mounted in a furnace wall, 304, 306, or 308, to inject at least a portion of bottom fraction 16' into furnace chamber 302. FIG. 3 shows a particular embodiment where there is one injection port 316 mounted on each of the four furnace walls. In one embodiment, injection ports 316 are inclined downwardly to inject bottom fraction 16' into burner 310 so at least a portion of bottom fraction 16' can be combusted. In a preferred embodiment, injection port 316 is configured to introduce bottom fraction 16' as droplets to facilitate combustion of combustible material, including lignin, in bottom fraction 16'. While FIG. 3 shows one injection port for each of the furnace walls, those skilled in the art will appreciate that other embodiments are also possible. For example, there can be embodiments in which there are more than one injection ports present in each wall or in which there is one injection port present in each of two opposing walls and no injection port or a different number of injection port present in the other walls.

Referring to FIG. 3, injection port 316 is positioned in combustion zone 318 to introduce bottom fraction 16' into that zone for combustion. Furnace component 104 has at least one port to introduce air into furnace chamber 302. FIG. 3 shows one particular exemplary embodiment where there are four sets of air ports: primary ports 320, secondary ports 322, quaternary ports 324, and tertiary ports 326. Nevertheless, the number, arrangement, dimension, and shape of such port and/or other means to introduce air for combustion can be of any manner known to those skilled in the art. For example, in one embodiment, furnace chamber 302 includes at least primary ports 320 and quaternary ports 324. In other embodiments, secondary ports 322 will also be present. Tertiary ports 326 need not be present in certain embodiments.

In one embodiment, furnace component 104 is operated at a temperature sufficient to combust at least a portion of bottom fraction 16', preferably at a temperature sufficient to combust at least some lignin in bottom fraction 16'. Referring to FIG. 3, in a particular embodiment, the temperature of combustion zone 318 is in a range of at least 500 and up to about 1150 degrees Celsius. In another embodiment, the temperature in combustion zone 318 is at least about 1000 degrees Celsius, particularly in a range of about 1000 to 1200 degrees Celsius. In a preferred embodiment, injection ports 316 introduces bottom fraction 16' into combustion zone 18 as droplets, where lignin and other combustible related by-products in bottom fraction 16', is burned to generate gases having an elevated temperature that rises to the top of furnace chamber 302. In certain embodiments, hot gases exit furnace component 104 and enter heat exchange component 102 to vaporize volatile organic compounds in bottom fraction 16. Oxygen containing fluid (not shown) supporting the combustion enters furnace chamber 302 through various ports 320, 322, 324, and/or 326. Combustion residue exits furnace chamber 302 through combustion residue removal spouts 312 and into collection tank 314.

Figure 4:
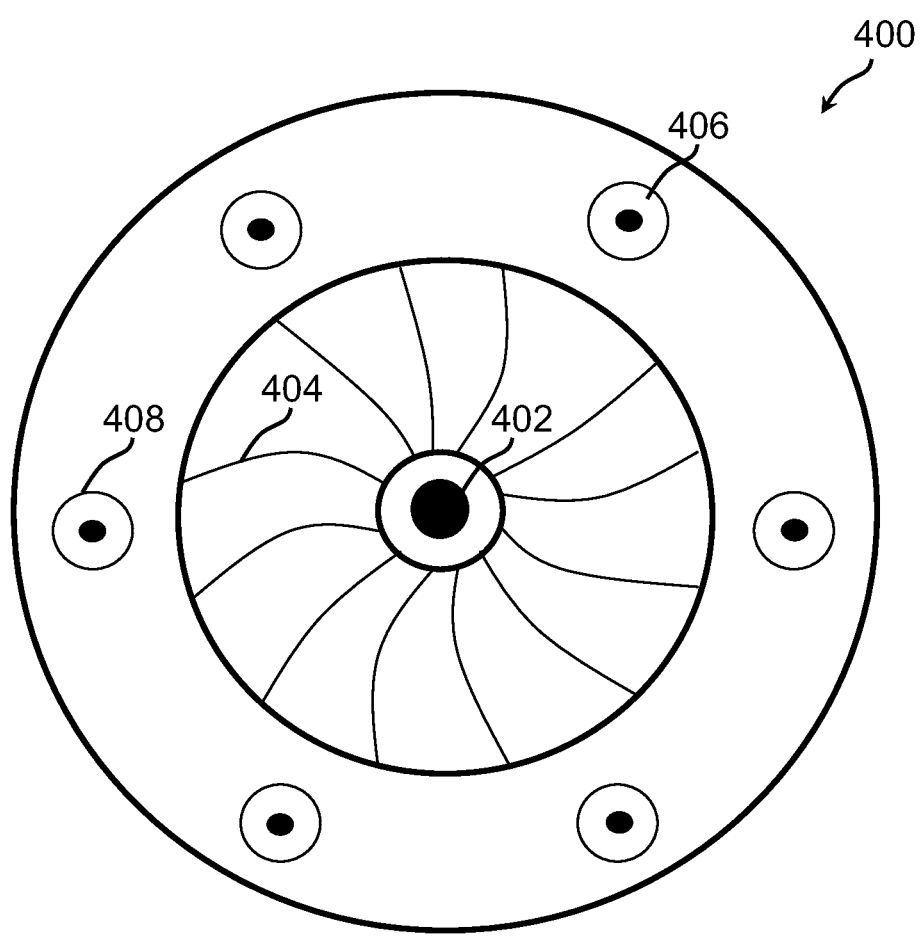
FIG. 4 is a schematic of an exemplary embodiment of an atomizing burner of a recovery unit according to aspects provided by the present disclosure.

In addition to or instead of injection ports 316 and burner 310, one or more atomizing burner, such as that shown in FIG. 4, disposed in one or more walls (304, 306, 308 of FIG. 3) can be used to combust at least a portion of bottom fraction 16' in furnace component 102. As shown in FIG. 4, atomizing burner 400 comprises atomizing gun 402, which delivers bottom fraction 16' to furnace component 102 for combustion. Atomizing gun 402 is surrounded by blades 404, the spinning of which provide oxygen containing fluid such as air for combustion of bottom fraction 16'. Atomizing burner 400 further includes pilot 406 and fuel 408, such as natural gas, to initiate and/or facilitate the combustion process as desired.

In one embodiment, bottom fraction 16' delivered by atomizing burner 400 has a viscosity in a range of about 75 to 250 Saybolt Universal Seconds (SSU) with a heating value of about 10,000 to 19,000 btu/hr. In another embodiment, atomizing burner 400 is configured to feed bottom fraction 16' to combustion zone 318 at a temperature in a range of about 125 to 175 degrees Celsius, or about 130 to 160 degrees C., and a pressure of about 200 to 250 psi. In one embodiment, atomizing burner 400 has a flow rate of up to about 6,200 lbs/hr. In yet another embodiment, atomizing steam can be added at a pressure in a range of about 225 to 275 psi for an approximately 0.3 lbs/1.0 lb consumption of bottom fraction 16'.

Heat exchange component 102 can be any heat exchange device, i.e. a device adapted to transfer thermal energy between bottom fraction 16 and heat exchange medium 116, without allowing the fluids to mix, to vaporize a volatile organic compound in bottom fraction 16. In one embodiment, to prevent mixing of the fluids, the heat exchange device provides a bather between the two fluids. Exemplary types of heat exchange device include a "plate and frame" design, where two fluid streams flow pass one another on opposing sides of one or more plates. The total heat transfer surface may be increased by increasing the area of plates and the number of plates. Another exemplary design is a "tube and shell" design, where one stream of fluid flows through the tube(s) and the other through the remaining space inside a shell that surrounds the tubes. The conduits used to fluidly couple the heat exchange component and the furnace components, and conduits into and out of the recovery unit provided by the present disclosure, such as tubes or pipes, are known to those skilled in the art, and thus a detailed thereof is not necessary herein. Heat exchange component 102 can be made of any suitable material. One non-limiting exemplary suitable material is steel.

Figure 5:
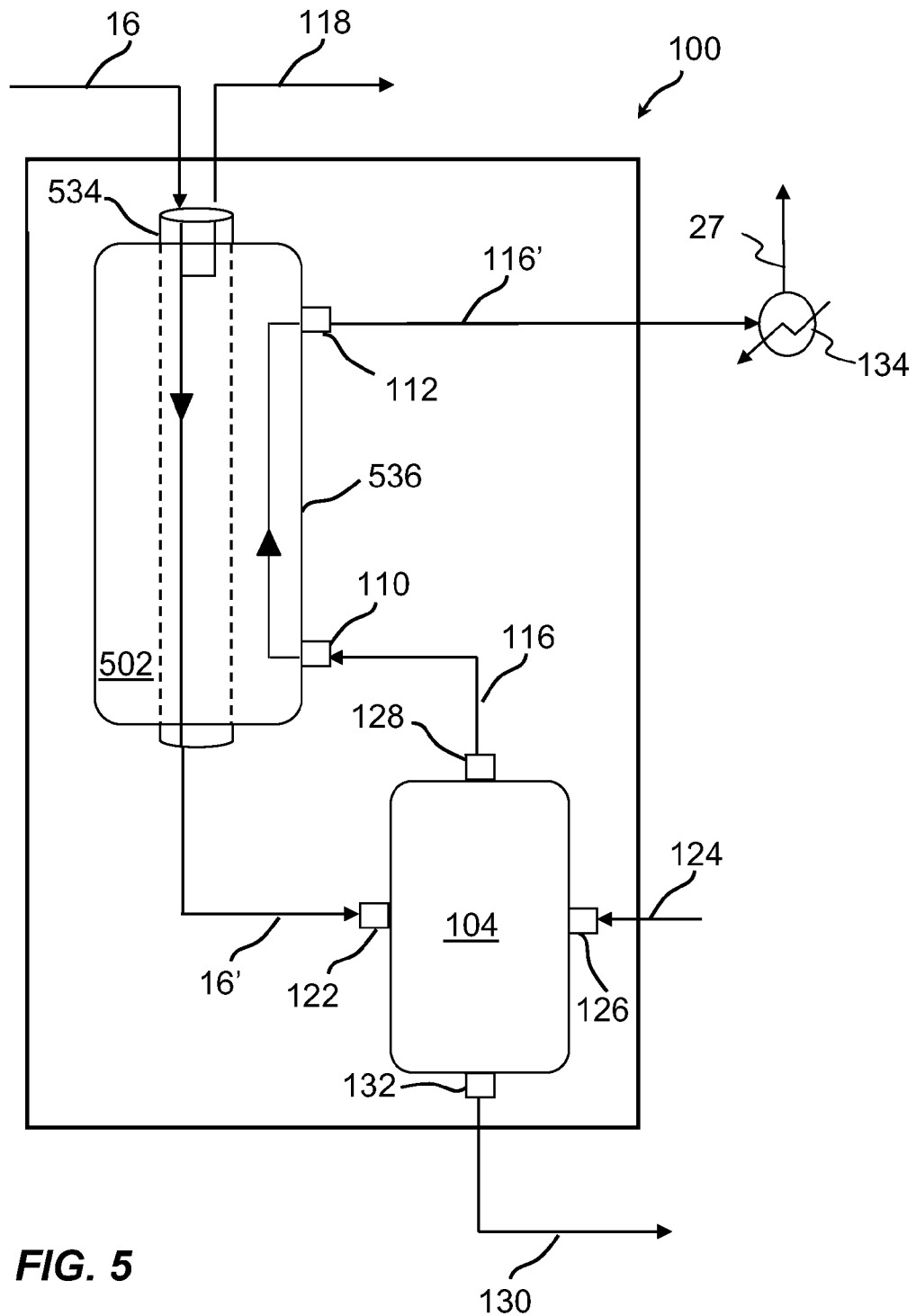
FIG. 5 is a schematic of a second exemplary embodiment of a recovery unit according to aspects provided by the present disclosure.

FIG. 5 shows another embodiment of recovery unit 100, where the heat exchange component comprises a tube and shell heat exchanger. As shown, heat exchange component 502 has tube element 534 disposed in shell element 536. While only one tube element is shown, it is understood by those of ordinary skill in the art that heat exchange component 502 can have a plurality of tube elements 534 and/or more than one heat exchange component 502 can be used. That is, the number, arrangement, dimension, and shape of the heat exchange component and its elements can be of any suitable manner known to those skilled in the art.

Referring to FIG. 5, in one exemplary manner of operating recovery unit 100, bottom fraction 16 flows through tube element 534 while heat exchange medium 116 flows through shell element 536. As bottom fraction 16 and heat exchange medium 116 move pass each other, heat transfer from heat exchange medium 116 to bottom fraction 16 takes place and vaporizes at least a portion of volatile organic compounds in bottom fraction 16. The vaporized volatile organic compounds exit as overhead product 118 for further processing to produce the desired product(s). Bottom fraction 16 exits tube element 534 without the vaporized compounds as bottom fraction 16' and enters furnace component 104 for combustion to provide at least a portion of heat exchange medium 116 as described above. Combustion residue 130, which contains materials not combusted, exits furnace component 104 through outlet 132.

Figure 6:
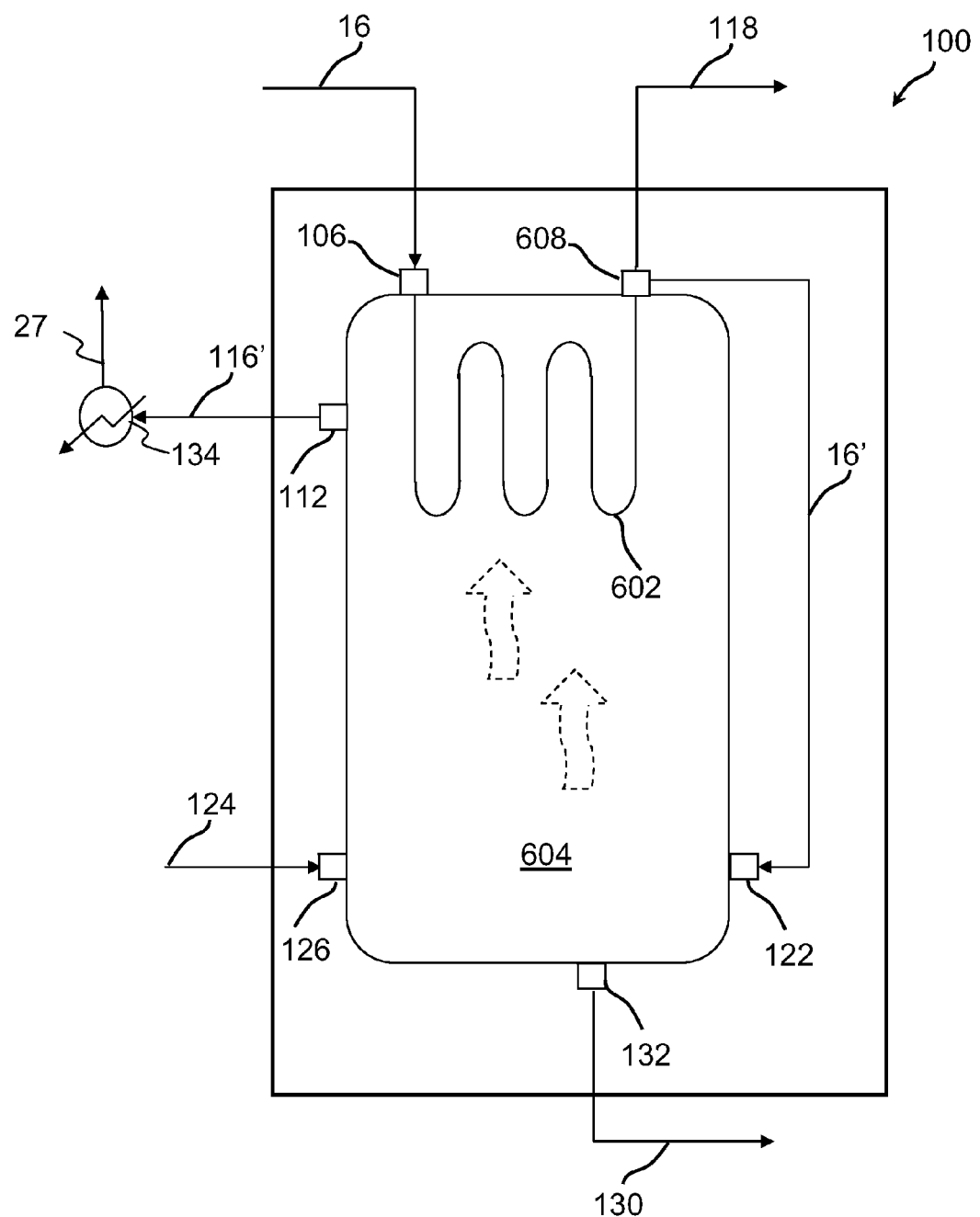
FIG. 6 is a schematic of a third exemplary embodiment of a recovery unit according to aspects provided by the present disclosure.

FIG. 6 shows another embodiment of recovery unit 100 where the heat exchange component is disposed in the furnace component. As shown, heat exchange component 602 is disposed in the furnace chamber of furnace component 604 above the combustion zone. Heat exchange component 602 provides a convection surface area through which thermal energy from heat exchange medium 116 is transferred to bottom fraction 16 flowing through heat exchange component 602. As shown, to increase the convection surface area, heat exchange component 602 can have one or more folds. The number, arrangement, dimension, and shape of the heat exchange component and its elements can be of any suitable manner known to those skilled in the art.

Referring to FIG. 6, in one exemplary manner of operating recovery unit 100, bottom fraction 16 enters heat exchange component 602 through port 106 for VOC recovery while heat exchange medium 116 rises from the combustion zone of furnace component 104. Heat exchange medium 116 heats up bottom fraction 16 flowing through heat exchange component 602 and vaporizes at least a portion of volatile organic compounds in bottom fraction 16. The vaporized volatile organic compounds exit through outlet 608 as overhead product 118 for further processing to produce the desired product(s). As shown, bottom fraction 16' exits heat exchange component 602 through outlet 608 without organic compounds that have been recovered and enters furnace component 604 for combustion to provide at least a portion of heat exchange medium 116 as described above. While FIG. 6 depicts bottom fraction 16' and overhead product 118 exiting through the same outlet, it is contemplated that other embodiments can have different suitable arrangements. Combustion residue 130, which contains materials not combusted, exits furnace component 104 through outlet 132. As shown, FIG. 6 illustrates one embodiment where recovery unit 100 can be considered an integrated boiler that provides for recovery of volatile organic compounds in bottom fraction 16 and combustion of bottom fraction 16, which contains lignin and other related by-product materials.

Any suitable distillation techniques known to one of ordinary skill in the art can be used to apply thermal energy from heat exchange medium 116 to vaporize organic compounds in bottom fraction 16. For example, in a preferred embodiment, the heat exchange component (such as 102, 502, and 602 of FIGS. 2, 5, and 6, respectively) provides multistage distillation where volatile organic compounds (VOCs) with lower volatilization temperatures, such as below water, are vaporized first to the overhead, followed by water and/or other VOCs as the temperature applied to the distillation increases. For example, one or more temperatures in a range of about 100 to 600 degrees C. and a pressure in a range of about 0.01 to 250 psi can be applied to bottom fraction 16 in heat exchange component 102 in one or multiple stages using at least a portion of heat exchange medium 116. Preferably, one or more temperatures in a range of about 100 to 600 degrees C. and a pressure in a range of about 0.05 to 150 psi can be applied to bottom fraction 16 in one or multiple stages using at least a portion of heat exchange medium 116. More preferably, one or more temperatures in a range of about 200 to 450 degrees C. and a pressure in a range of about 0.01 to 250 psi or about 0.05 to 150 psi can be applied to bottom fraction 16 in one or multiple stages using at least a portion of heat exchange medium 116. Most preferably, a temperature of at least 300 degrees C. and a pressure in a range of about 0.01 to 250 psi or about 0.05 to 150 psi can be applied to bottom fraction 16 in one or multiple stages using at least a portion of heat exchange medium 116. In a preferred embodiment, if a multistage distillation technique is used, the initial stage starts with low temperature and subsequent stages have increasingly higher temperatures until the final or bottoms stage has the highest temperature.

Referring to FIG. 1, In embodiments where the distillation or vaporization of organic compounds in bottom fraction 16 is carried out at higher than atmospheric pressure (about 1 atm or about 14.696 psi), the higher pressure can facilitate transport of overhead product 118 to the next processing step, such as further processing zone 19. In a preferred embodiment, if higher than atmospheric pressure is used, the pressure applied is about the same pressure or slightly higher than the pressure of the next reaction stage. For example, in one embodiment, the pressure for overhead product 118 can be the same or slightly higher than the operating pressure of further processing zone 19. For such embodiments employing distillation at higher than atmospheric pressure, the process can be more energy efficient since the need to condense the VOCs and subsequent vaporization in preparation for the next stage is eliminated or substantially minimized. In one embodiment, a stripping agent such as steam can optionally be used to facilitate flow of overhead product 118 to the next reaction zone. In another embodiment, a pressure of about 15 to 30 psi is used if it is desired to prevent air from entering the heat exchange process. In yet another embodiment, the heat exchange can take place under vacuum, which can prevent formation of heavy ends.

Referring to FIGS. 2, 5, and 6, in certain embodiments, recovery unit 100 also includes other components that increase the heat exchange efficiency known to those skilled in the art. For example, in one embodiment, the recovery unit further includes an economizer that preheats bottom fraction 16 using spent heat exchange medium 116' and circulates the preheated bottom fraction 16 to an inlet of the heat exchange component. The number, arrangement, dimension, and shape of the economizer can be of any suitable manner known to those skilled in the art. Alternatively or in addition to, in one embodiment, the furnace component comprises a plurality of tubes lining one or more of the walls of the furnace component through which bottom fraction 16 can flow through to get preheated prior to entering the heat exchange component, thereby further taking advantage of the thermal energy generated by the furnace component. Certain embodiments with the heat exchange component disposed in the furnace components can also include one or more soot blowers to clean exterior of the heat exchange component of dust and other forms of coating. Referring to FIGS. 2, 5, and 6, in yet another embodiment, recovery unit 100 can further comprise one or more superheaters for increasing the temperature of bottom fraction 16 and overhead product 118 moving through the heat exchange component as desired. For example, different stages with different temperatures of heating bottom fraction 16 to vaporize different compounds in bottom fraction 16 may require use of one or more superheaters to achieve the desired operating conditions. The number, arrangement, dimension, and shape of the superheater can be of any suitable manner known to those skilled in the art.

Therefore, embodiments described herein are well adapted to attain the ends and advantages mentioned as well as those that are inherent therein. For instance, embodiments described herein allow for the recovery of volatile organic compounds intermediates, which may be value precursors for further processing into higher molecular weight hydrocarbons, from a reaction product mixture of a cellulosic biomass material. The reaction product mixture can contain lignin, related by-products, and other contaminants that are heavy and/or detrimental to the further processing of volatile organic compound intermediates, such as catalysts. Embodiments described herein can be operated continuously at steady state where combustion of at least combustible components in bottom fraction 16 provides at least a portion of thermal energy used to vaporize the volatile organic compounds in bottom fraction 16.

Descriptions of exemplary suitable hydrocatalytic reactions that can take place in digestion unit 12 are known to those skilled in the art and/or provided by U.S. Application Publication Nos. US2011/0154721, US2012/0152836, US2012/0156743, and US2013/0109896, and U.S. Application Nos. 61/665,641, filed on Jun. 28, 2012, and 61/720,757, filed on Oct. 31, 2012, and 61/817,996, where each disclosure is incorporated herein by reference. Likewise, descriptions of exemplary suitable further processing reactions that can take place in processing zone 19 are known to those skilled in the art and/or provided by the materials that have been incorporated by reference in their entirety. Accordingly, the details of hydrocatalytic reactions and further processing reactions need not be repeated.

Nevertheless, the descriptions below highlight some aspects of certain hydrocatalytic reactions, such as hydrothermal digestion and catalytic reduction reactions, and further processing reactions. It is understood that in various embodiments where digestion unit 12 and/or hydrocatalytic treatment system 17 are employed to carry out hydrocatalytic reactions, digestion unit 12 and/or hydrocatalytic treatment system 17 can comprise any number, combination, and type of reactors to perform one or more hydrocatalytic reactions.

In certain embodiments where digestion unit 12 comprises hydrothermal digestion and one or more catalytic reduction reactions, the hydrothermal digestion and one or more catalytic reduction reactions take place in the same vessel, which can provide an effective stabilization of soluble carbohydrates. The foregoing may be accomplished by including a slurry catalyst capable of activating molecular hydrogen within a hydrothermal digestion unit containing cellulosic biomass solids. That is, the catalyst that is capable of activating molecular hydrogen may comprise a slurry catalyst. As used herein, the term "slurry catalyst" refers to a catalyst comprising fluidly mobile catalyst particles that can be at least partially suspended in a fluid phase via gas flow, liquid flow, mechanical agitation, or any combination thereof. Formation of the reaction product may reduce the amount of thermal decomposition that occurs during hydrothermal digestion, thereby enabling high yield conversion of cellulosic biomass solids into a desired reaction product to take place in a timely manner.

Once the soluble carbohydrates have been at least partially transformed into a more stable reaction product during hydrothermal digestion, completion of the conversion of the soluble carbohydrates into the reaction product may take place in a separate catalytic reduction reactor unit that also employs the slurry catalyst or a different catalyst that is capable of activating molecular hydrogen. The transformation that takes place in the catalytic reduction reactor unit may comprise a further reduction in the degree of oxidation of the initial reaction product, an increased conversion of soluble carbohydrates into oxygenated intermediates, or both. As used herein, the term "oxygenated intermediates" refers to alcohols, polyols, ketones, aldehydes, and mixtures thereof that are produced from a catalytic reduction reaction of soluble carbohydrates.

Continuous, high temperature hydrothermal digestion may be accomplished by configuring the biomass conversion systems such that fresh biomass may be continuously or semi-continuously supplied to the hydrothermal digestion unit, while it operates in a pressurized state. As used herein, the term "continuous addition" and grammatical equivalents thereof will refer to a process in which cellulosic biomass is added to a hydrothermal digestion unit in an uninterrupted manner without fully depressurizing the hydrothermal digestion unit. As used herein, the term "semi-continuous addition" and grammatical equivalents thereof will refer to a discontinuous, but as-needed, addition of biomass to a hydrothermal digestion unit without fully depressurizing the hydrothermal digestion unit.

In some embodiments described herein, a slurry catalyst may be used both in the hydrothermal digestion unit and in the catalytic reduction reactor unit to mediate the catalytic reduction reaction of soluble carbohydrates into a reaction product. Retention of the slurry catalyst in the hydrothermal digestion unit may also be aided by the low recycle ratios that may be used in the biomass conversion systems described herein. In any event, circulation of the slurry catalyst through the cellulosic biomass charge within the hydrothermal digestion unit can provide good catalyst distribution within the biomass, thereby allowing soluble carbohydrates to be effectively stabilized via a catalytic reduction reaction as soon as possible following their formation.

Since a slurry catalyst can be fluidly mobile, hydrogen sparge, solvent recycle, or any combination thereof may be used to distribute the slurry catalyst throughout the cellulosic biomass charge in the hydrothermal digestion unit. Good catalyst distribution in the cellulosic biomass may improve yields by intercepting soluble carbohydrates before they have an opportunity to degrade. Furthermore, use of a slurry catalyst may allow a fixed bed digestion unit to be more successfully used, since mechanical stirring or like mechanical agitation is not needed to affect catalyst distribution. This can allow higher biomass to solvent ratios to be utilized per unit volume of the digestion unit than would be possible in stirred tank or like digestion unit configurations. Furthermore, since stirring is not necessary, there is no express need to alter the size of the biomass solids prior to digestion taking place.

In one embodiment, poison-tolerant slurry catalyst is used. Use of a poison-tolerant catalyst may be particularly desirable, since catalyst poisons are not removed from the cellulosic biomass solids before hydrothermal digestion and integrated catalytic reduction take place. As used herein, a "poison-tolerant catalyst" is defined as a catalyst that is capable of activating molecular hydrogen without needing to be regenerated or replaced due to low catalytic activity for at least about 12 hours of continuous operation.

In some embodiments, suitable poison-tolerant catalysts may include, for example, sulfided catalysts. In some or other embodiments, nitrided catalysts may be used as poison-tolerant catalysts. Sulfided catalysts suitable for activating molecular hydrogen are described in commonly owned U.S. application Ser. No. 13/495,785, filed on Jun. 13, 2012, and 61/553,591, filed on Oct. 31, 2011, each of which is incorporated herein by reference in its entirety. Sulfiding may take place by treating the catalyst with hydrogen sulfide or an alternative sulfiding agent, optionally while the catalyst is disposed on a solid support. In more particular embodiments, the poison-tolerant catalyst may comprise a sulfided cobalt-molybdate catalyst, such as a catalyst comprising about 1-10 wt. % cobalt oxide and up to about 30 wt. % molybdenum trioxide prior to sulfidation. In other embodiments, catalysts containing Pt or Pd may also be effective poison-tolerant catalysts for use in the techniques described herein. When mediating in situ catalytic reduction reaction processes, sulfided catalysts may be particularly well suited to form reaction products comprising a substantial fraction of glycols (e.g., $C_2$-$C_6$ glycols) without producing excessive amounts of the corresponding monohydric alcohols. Although poison-tolerant catalysts, particularly sulfided catalysts, may be well suited for forming glycols from soluble carbohydrates, it is to be recognized that other types of catalysts, which may not necessarily be poison-tolerant, may also be used to achieve a like result in alternative embodiments. As will be recognized by one having ordinary skill in the art, various reaction parameters (e.g., temperature, pressure, catalyst composition, introduction of other components, and the like) may be modified to favor the formation of a desired reaction product. Given the benefit of the present disclosure, one having ordinary skill in the art will be able to alter various reaction parameters to change the product distribution obtained from a particular catalyst and set of reactants.

Catalysts that are not particularly poison-tolerant may also be used in conjunction with the techniques described herein. Such catalysts may include, for example, Ru, Pt, Pd, or compounds thereof disposed on a solid support such as, for example, Ru on titanium dioxide or Ru on carbon. Although such catalysts may not have particular poison tolerance, they may be regenerable, such as through exposure of the catalyst to water at elevated temperatures, which may be in either a subcritical state or a supercritical state.

In some embodiments, slurry catalysts suitable for use in the methods described herein may be sulfided by dispersing a slurry catalyst in a fluid phase and adding a sulfiding agent thereto. Suitable sulfiding agents may include, for example, organic sulfoxides (e.g., dimethyl sulfoxide), hydrogen sulfide, salts of hydrogen sulfide (e.g., NaSH), and the like. In some embodiments, the slurry catalyst may be concentrated in the fluid phase after sulfiding and then added to the hydrothermal digestion unit.

In some embodiments, the slurry catalyst may be operable to generate molecular hydrogen. For example, in some embodiments, catalysts suitable for aqueous phase reforming (i.e., APR catalysts) may be used. Suitable APR catalysts may include, for example, catalysts comprising platinum, palladium, ruthenium, nickel, cobalt, or other Group VIII metals alloyed or modified with rhenium, molybdenum, tin, or other metals, or sulfided. However, in other embodiments, an external hydrogen feed may be used, optionally in combination with internally generated hydrogen.

In various embodiments, slurry catalysts used in embodiments described herein may have a particulate size of about 250 microns or less. In some embodiments, the slurry catalyst may have a particulate size of about 100 microns or less, or about 10 microns or less. In some embodiments, the minimum particulate size of the slurry catalyst may be about 1 micron.

In general, digestion in the hydrothermal digestion unit, if employed, may be conducted in a liquor phase. In some embodiments, the liquor phase may comprise a digestion solvent that comprises water. In some embodiments, the liquor phase may further comprise an organic solvent. Although any organic solvent that is at least partially miscible with water may be used as a digestion solvent, particularly suitable organic solvents are those that can be directly converted into fuel blends and other materials without being separated from the product mixture of the hydrothermal digestion. That is, particularly suitable organic solvents are those that may be co-processed along with the product mixture of the hydrothermal digestion into fuel blends and other materials during further processing reactions. Suitable organic solvents in this regard may include, for example, ethanol, ethylene glycol, propylene glycol, glycerol, and any combination thereof. In some embodiments, the organic solvent may comprise oxygenated intermediates produced from a catalytic reduction reaction of soluble carbohydrates. For example, in some embodiments, a digestion solvent may comprise oxygenated intermediates produced by a hydrogenolysis reaction or other catalytic reduction reaction of soluble carbohydrates. In some embodiments, the oxygenated intermediates may include those produced from an in situ catalytic reduction reaction and/or from the catalytic reduction reactor unit.

In some embodiments employing hydrothermal digestion, the digestion solvent may further comprise a small amount of a monohydric alcohol. The presence of at least some monohydric alcohols in the fluid phase digestion medium may desirably enhance the hydrothermal digestion and/or the catalytic reduction reactions being conducted therein. For example, inclusion of about 1% to about 5% by weight monohydric alcohols in the fluid phase digestion medium may desirably maintain catalyst activity due to a surface cleaning effect. Monohydric alcohols present in the digestion solvent may arise from any suitable source. In some embodiments, the monohydric alcohols may be formed via the in situ catalytic reduction reaction process being conducted therein. In some or other embodiments, the monohydric alcohols may be formed during further chemical transformations of the initially formed product mixture of the hydrothermal digestion. In still other embodiments, the monohydric alcohols may be sourced from an external feed that is in flow communication with the cellulosic biomass solids.

In some embodiments, the digestion solvent may comprise between about 1% water and about 99% water. Although higher percentages of water may be more favorable from an environmental standpoint, higher quantities of organic solvent may more effectively promote hydrothermal digestion due to the organic solvent's greater propensity to solubilize carbohydrates and promote catalytic reduction of the soluble carbohydrates. In some embodiments, the digestion solvent may comprise about 90% or less water by weight. In other embodiments, the digestion solvent may comprise about 80% or less water by weight, or about 70% or less water by weight, or about 60% or less water by weight, or about 50% or less water by weight, or about 40% or less water by weight, or about 30% or less water by weight, or about 20% or less water by weight, or about 10% or less water by weight, or about 5% or less water by weight.

In some embodiments, the digestion solvent may comprise an organic solvent comprising oxygenated intermediates resulting from a catalytic reduction reaction of soluble carbohydrates. The catalytic reduction reaction may take place in the hydrothermal digestion unit and/or in the catalytic reduction reactor unit. In some embodiments, the organic solvent may comprise at least one alcohol, ketone, or polyol. In alternative embodiments, the digestion solvent may be at least partially supplied from an external source. For example, in some embodiments, bio-ethanol may be used to supplement the organic solvent. Other water-miscible organic solvents may be used as well. In some embodiments, the digestion solvent may be separated, stored, or selectively injected into the hydrothermal digestion unit to maintain a desired concentration of soluble carbohydrates or to provide temperature regulation in the hydrothermal digestion unit.

In various embodiments, digestion may take place over a period of time at elevated temperatures and pressures. In some embodiments, digestion may take place at a temperature ranging between about 100 to about 240 degrees C. for a period of time. In some embodiments, the period of time may range of about 0.25 to 24 hours. In some embodiments, the digestion to produce soluble carbohydrates may occur at a pressure ranging between about 1 bar (absolute) and about 100 bar. In general, the higher the temperature, the shorter the amount of time needed for hydrothermal digestion steps to take place. As an example, hydrothermal digestion may take place for about 1 hour to about 10 hours at a temperature of about 180 to about 270 degrees C., most typically from about 190 to 250 degrees C.

In various embodiments, suitable biomass digestion techniques may include, for example, acid digestion, alkaline digestion, enzymatic digestion, and digestion using hot-compressed water. In some embodiments, the methods may further comprise withdrawing at least a portion of the reaction product from the biomass conversion system (e.g., from the outlet of the catalytic reduction reactor unit or from the fluid circulation loop). In some embodiments, the methods may further comprise converting the reaction product into a biofuel, as described in further detail hereinafter. In some embodiments, the methods may further comprise separating solids (e.g., slurry catalyst, biomass fines, and the like) from the reaction product after its withdrawal from the biomass conversion system, as described above.

In some embodiments, the methods may further comprise recirculating at least a portion of the liquor phase from the catalytic reduction reactor unit to the hydrothermal digestion unit. As set forth above, the biomass conversion systems described herein are particularly suitable in being capable of rapidly at least partially transforming soluble carbohydrates into a reaction product comprising oxygenated intermediates by performing an in situ catalytic reduction reaction in the hydrothermal digestion unit. As also noted above, the liquor phase containing the reaction product may be recirculated from the catalytic reduction reactor unit to the hydrothermal digestion unit, where the liquor phase may, for example, help regulate temperature therein, serve as a digestion solvent, and the like. Recirculation from the catalytic reduction reactor unit to the hydrothermal digestion unit may take place at various recycle ratios. As used herein, the term "recycle ratio" refers to the amount of liquor phase that is recirculated to the hydrothermal digestion unit (e.g., within the fluid circulation loop) relative to the amount of liquor phase that is withdrawn from the biomass conversion system (e.g., by a reaction product takeoff line).

In some embodiments, the catalytic reduction reactions carried out may be hydrogenolysis reactions. In some embodiments, the catalytic reduction reaction may take place at a temperature ranging between about 110° C. and about 300° C., or between about 170° C. and about 300° C., or between about 180° C. and about 290° C., or between about 150° C. and about 250° C. In some embodiments, the catalytic reduction reaction may take place at a pH ranging between about 7 and about 13, or between about 10 and about 12. In other embodiments, the catalytic reduction reaction may take place under acidic conditions, such as at a pH of about 5 to about 7. Acids, bases, and buffers may be introduced as necessary to achieve a desired pH level. In some embodiments, the catalytic reduction reaction may be conducted under a hydrogen partial pressure ranging between about 1 bar (absolute) and about 150 bar, or between about 15 bar and about 140 bar, or between about 30 bar and about 130 bar, or between about 50 bar and about 110 bar.

In some embodiments, catalysts capable of activating molecular hydrogen and conducting a catalytic reduction reaction may comprise a metal such as, for example, Cr, Mo, W, Re, Mn, Cu, Cd, Fe, Co, Ni, Pt, Pd, Rh, Ru, Ir, Os, and alloys or any combination thereof, either alone or with promoters such as Au, Ag, Cr, Zn, Mn, Sn, Bi, B, O, and alloys or any combination thereof. In some embodiments, the catalysts and promoters may allow for hydrogenation and hydrogenolysis reactions to occur at the same time or in succession of one another. In some embodiments, such catalysts may also comprise a carbonaceous pyropolymer catalyst containing transition metals (e.g., Cr, Mo, W, Re, Mn, Cu, and Cd) or Group VIII metals (e.g., Fe, Co, Ni, Pt, Pd, Rh, Ru, Ir, and Os). In some embodiments, the foregoing catalysts may be combined with an alkaline earth metal oxide or adhered to a catalytically active support. In some or other embodiments, the catalyst capable of activating molecular hydrogen may be deposited on a catalyst support that is not itself catalytically active.

In some embodiments, slurry catalysts suitable for use in the methods described herein may be sulfided by dispersing a slurry catalyst in a fluid phase and adding a sulfiding agent thereto. Suitable sulfiding agents may include, for example, organic sulfoxides (e.g., dimethyl sulfoxide), hydrogen sulfide, salts of hydrogen sulfide (e.g., NaSH), amino acids derived from proteins present in biomass feedstock 11 and the like. In some embodiments, the slurry catalyst may be concentrated in the fluid phase after sulfiding, and the concentrated slurry may then be distributed in the cellulosic biomass solids using fluid flow. Illustrative techniques for catalyst sulfiding that may be used in conjunction with the methods described herein are described in U.S. application Ser. No. 12/407,479 (U.S. Application Publication No. 20100236988), filed on Mar. 19, 2009 and incorporated herein by reference in its entirety.

In some embodiments, as mentioned above, product mixture 13 and/or hydrocatalytically treated mixture 18, preferably as overhead fraction 15, and/or overhead product 118 may be further processed into a biofuel. Further processing of product mixture 13, hydrocatalytically treated mixture 18, and/or overhead product 118 into a biofuel or other material may comprise any combination and sequence of further hydrogenolysis reactions and/or hydrogenation reactions, condensation reactions, isomerization reactions, oligomerization reactions, hydrotreating reactions, alkylation reactions, dehydration reactions, desulfurization reactions, and the like. The subsequent further processing reactions may be catalytic or non-catalytic. In some embodiments, an initial operation of downstream further processing may comprise a condensation reaction, often conducted in the presence of a condensation catalyst, in which product mixture 13, hydrocatalytically treated mixture 18, overhead product 118, and/or a product derived therefrom is condensed with another molecule to form a higher molecular weight compound. As used herein, the term "condensation reaction" will refer to a chemical transformation in which two or more molecules are coupled with one another to form a carbon-carbon bond in a higher molecular weight compound, usually accompanied by the loss of a small molecule such as water or an alcohol. An illustrative condensation reaction is the Aldol condensation reaction, which will be familiar to one having ordinary skill in the art. Additional disclosure regarding condensation reactions and catalysts suitable for promoting condensation reactions is provided hereinbelow.

In some embodiments, methods described herein may further comprise performing a condensation reaction on product mixture 13, hydrocatalytically treated mixture 18, overhead product 118, and/or a product derived therefrom. In various embodiments, the condensation reaction may take place at a temperature ranging from about 5 to 500 degrees C. The condensation reaction may take place in a condensed phase (e.g., a liquor phase) or in a vapor phase. For condensation reactions taking place in a vapor phase, the temperature may range from about 75 to 500 degrees C., or from about 500 degrees C. or from about 125 to 450 degrees C. For condensation reactions taking place in a condensed phase, the temperature may range from about 5 to 475 degrees C., or from about 15 to 300 degrees C., or from about 20 to 250 degrees C.

In various embodiments, the higher molecular weight compound produced by the condensation reaction may comprise $\geq C_4$ hydrocarbons. In some or other embodiments, the higher molecular weight compound produced by the condensation reaction may comprise $\geq C_6$ hydrocarbons. In some embodiments, the higher molecular weight compound produced by the condensation reaction may comprise $C_4$-$C_{30}$ hydrocarbons. In some embodiments, the higher molecular weight compound produced by the condensation reaction may comprise $C_6$-$C_{30}$ hydrocarbons. In still other embodiments, the higher molecular weight compound produced by the condensation reaction may comprise $C_4$-$C_{24}$ hydrocarbons, or $C_6$-$C_{24}$ hydrocarbons, or $C_4$-$C_{18}$ hydrocarbons, or $C_6$-$C_{18}$ hydrocarbons, or $C_4$-$C_{12}$ hydrocarbons, or $C_6$-$C_{12}$ hydrocarbons. As used herein, the term "hydrocarbons" refers to compounds containing both carbon and hydrogen without reference to other elements that may be present. Thus, heteroatom-substituted compounds are also described herein by the term "hydrocarbons."

The particular composition of the higher molecular weight compound produced by the condensation reaction may vary depending on the catalyst(s) and temperatures used for both the catalytic reduction reaction and the condensation reaction, as well as other parameters such as pressure. For example, in some embodiments, the product of the condensation reaction may comprise $\geq C_4$ alcohols and/or ketones that are produced concurrently with or in lieu of $\geq C_4$ hydrocarbons. In some embodiments, the $\geq C_4$ hydrocarbons produced by the condensation reaction may contain various olefins in addition to alkanes of various sizes, typically branched alkanes. In still other embodiments, the $\geq C_4$ hydrocarbons produced by the condensation reaction may also comprise cyclic hydrocarbons and/or aromatic compounds. In some embodiments, the higher molecular weight compound produced by the condensation reaction may be further subjected to a catalytic reduction reaction to transform a carbonyl functionality therein to an alcohol and/or a hydrocarbon and to convert olefins into alkanes.

Exemplary compounds that may be produced by a condensation reaction include, for example, $\geq C_4$ alkanes, $\geq C_4$ alkenes, $\geq C_5$ cycloalkanes, $\geq C_5$ cycloalkenes, aryls, fused aryls, $\geq C_4$ alcohols, $\geq C_4$ ketones, and mixtures thereof. The $\geq C_4$ alkanes and $\geq C_4$ alkenes may range from 4 to about 30 carbon atoms (i.e. $C_4$-$C_{30}$ alkanes and $C_4$-$C_{30}$ alkenes) and may be branched or straight chain alkanes or alkenes. The $\geq C_4$ alkanes and $\geq C_4$ alkenes may also include fractions of $C_7$-$C_{14}$, $C_{12}$-$C_{24}$ alkanes and alkenes, respectively, with the $C_7$-$C_{14}$ fraction directed to jet fuel blends, and the $C_{12}$-$C_{24}$ fraction directed to diesel fuel blends and other industrial applications. Examples of various ≥$C_4$ alkanes and ≥$C_4$ alkenes that may be produced by the condensation reaction include, without limitation, butane, butene, pentane, pentene, 2-methylbutane, hexane, hexene, 2-methylpentane, 3-methylpentane, 2,2-dimethylbutane, 2,3-dimethylbutane, heptane, heptene, octane, octene, 2,2,4,-trimethylpentane, 2,3-dimethylhexane, 2,3,4-trimethylpentane, 2,3-dimethylpentane, nonane, nonene, decane, decene, undecane, undecene, dodecane, dodecene, tridecane, tridecene, tetradecane, tetradecene, pentadecane, pentadecene, hexadecane, hexadecene, heptyldecane, heptyldecene, octyldecane, octyldecene, nonyldecane, nonyldecene, eicosane, eicosene, uneicosane, uneicosene, doeicosane, doeicosene, trieicosane, trieicosene, tetraeicosane, tetraeicosene, and isomers thereof.

The ≥$C_5$ cycloalkanes and ≥$C_5$ cycloalkenes may have from 5 to about 30 carbon atoms and may be unsubstituted, mono-substituted or multi-substituted. In the case of mono-substituted and multi-substituted compounds, the substituted group may include a branched ≥$C_3$ alkyl, a straight chain ≥$C_1$ alkyl, a branched ≥$C_3$ alkylene, a straight chain ≥$C_1$ alkylene, a straight chain ≥$C_2$ alkylene, an aryl group, or a combination thereof. In some embodiments, at least one of the substituted groups may include a branched $C_3$-$C_{12}$ alkyl, a straight chain $C_1$-$C_{12}$ alkyl, a branched $C_3$-$C_{12}$ alkylene, a straight chain $C_1$-$C_{12}$ alkylene, a straight chain $C_2$-$C_{12}$ alkylene, an aryl group, or a combination thereof. In yet other embodiments, at least one of the substituted groups may include a branched $C_3$-$C_4$ alkyl, a straight chain $C_1$-$C_4$ alkyl, a branched $C_3$-$C_4$ alkylene, a straight chain $C_1$-$C_4$ alkylene, a straight chain $C_2$-$C_4$ alkylene, an aryl group, or any combination thereof. Examples of ≥$C_5$ cycloalkanes and ≥$C_5$ cycloalkenes that may be produced by the condensation reaction include, without limitation, cyclopentane, cyclopentene, cyclohexane, cyclohexene, methylcyclopentane, methylcyclopentene, ethylcyclopentane, ethylcyclopentene, ethylcyclohexane, ethylcyclohexene, and isomers thereof.

The moderate fractions of the condensation reaction, such as $C_7$-$C_{14}$, may be separated for jet fuel, while heavier fractions, such as $C_{12}$-$C_{24}$, may be separated for diesel use. The heaviest fractions may be used as lubricants or cracked to produce additional gasoline and/or diesel fractions. The ≥$C_4$ compounds may also find use as industrial chemicals, whether as an intermediate or an end product. For example, the aryl compounds toluene, xylene, ethylbenzene, para-xylene, meta-xylene, and ortho-xylene may find use as chemical intermediates for the production of plastics and other products. Meanwhile, $C_9$ aromatic compounds and fused aryl compounds, such as naphthalene, anthracene, tetrahydronaphthalene, and decahydronaphthalene, may find use as solvents or additives in industrial processes.

In some embodiments, a single catalyst may mediate the transformation of product mixture 13 and/or hydrocatalytically treated mixture 18, preferably as overhead fraction 15, and/or overhead product 118 into a form suitable for undergoing a condensation reaction as well as mediating the condensation reaction itself. In other embodiments, a first catalyst may be used to mediate the transformation of product mixture 13, hydrocatalytically treated mixture 18, and/or overhead product 118 into a form suitable for undergoing a condensation reaction, and a second catalyst may be used to mediate the condensation reaction. Unless otherwise specified, it is to be understood that reference herein to a condensation reaction and condensation catalyst refers to either type of condensation process. Further disclosure of suitable condensation catalysts now follows.

In some embodiments, a single catalyst may be used to form a higher molecular weight compound via a condensation reaction. Without being bound by any theory or mechanism, it is believed that such catalysts may mediate an initial dehydrogenation of products subject to further processing, such as that in further processing zone 19, e.g. (product mixture 13, hydrocatalytically treated mixture 18, and/or overhead product 118) followed by a condensation reaction of the dehydrogenated alcoholic component. Zeolite catalysts are one type of catalyst suitable for directly converting alcohols to condensation products in such a manner. A particularly suitable zeolite catalyst in this regard may be ZSM-5, although other zeolite catalysts may also be suitable.

In some embodiments, two catalysts may be used to form a higher molecular weight compound via a condensation reaction. Without being bound by any theory or mechanism, it is believed that the first catalyst may mediate an initial dehydrogenation of products subject to further processing, and the second catalyst may mediate a condensation reaction of the dehydrogenated products. Like the single-catalyst embodiments discussed previously above, in some embodiments, zeolite catalysts may be used as either the first catalyst or the second catalyst. Again, a particularly suitable zeolite catalyst in this regard may be ZSM-5, although other zeolite catalysts may also be suitable.

Various catalytic processes may be used to form higher molecular weight compounds by a condensation reaction. In some embodiments, the catalyst used for mediating a condensation reaction may comprise a basic site, or both an acidic site and a basic site. Catalysts comprising both an acidic site and a basic site will be referred to herein as multi-functional catalysts. In some or other embodiments, a catalyst used for mediating a condensation reaction may comprise one or more metal atoms. Any of the condensation catalysts may also optionally be disposed on a solid support, if desired.

In some embodiments, the condensation catalyst may comprise a basic catalyst comprising Li, Na, K, Cs, B, Rb, Mg, Ca, Sr, Si, Ba, Al, Zn, Ce, La, Y, Sc, Y, Zr, Ti, hydrotalcite, zinc-aluminate, phosphate, base-treated aluminosilicate zeolite, a basic resin, basic nitride, alloys or any combination thereof. In some embodiments, the basic catalyst may also comprise an oxide of Ti, Zr, V, Nb, Ta, Mo, Cr, W, Mn, Re, Al, Ga, In, Co, Ni, Si, Cu, Zn, Sn, Cd, Mg, P, Fe, or any combination thereof. In some embodiments, the basic catalyst may comprise a mixed-oxide basic catalyst. Suitable mixed-oxide basic catalysts may comprise, for example, Si—Mg—O, Mg—Ti—O, Y—Mg—O, Y—Zr—O, Ti—Zr—O, Ce—Zr—O, Ce—Mg—O, Ca—Zr—O, La—Zr—O, B—Zr—O, La—Ti—O, B—Ti—O, and any combination thereof. In some embodiments, the condensation catalyst may further include a metal or alloys comprising metals such as, for example, Cu, Ag, Au, Pt, Ni, Fe, Co, Ru, Zn, Cd, Ga, In, Rh, Pd, Ir, Re, Mn, Cr, Mo, W, Sn, Bi, Pb, Os, alloys and combinations thereof. Use of metals in the condensation catalyst may be desirable when a dehydrogenation reaction is to be carried out in concert with the condensation reaction. Basic resins may include resins that exhibit basic functionality. The basic catalyst may be self-supporting or adhered to a support containing a material such as, for example, carbon, silica, alumina, zirconia, titania, vanadia, ceria, nitride, boron nitride, a heteropolyacid, alloys and mixtures thereof.

In some embodiments, the condensation catalyst may comprise a hydrotalcite material derived from a combination of MgO and $Al_2O_3$. In some embodiments, the condensation catalyst may comprise a zinc aluminate spinel formed from a combination of ZnO and $Al_2O_3$. In still other embodiments, the condensation catalyst may comprise a combination of ZnO, $Al_2O_3$, and CuO. Each of these materials may also contain an additional metal or alloy, including those more generally referenced above for basic condensation catalysts. In more particular embodiments, the additional metal or alloy may comprise a Group 10 metal such Pd, Pt, or any combination thereof.

In some embodiments, the condensation catalyst may comprise a basic catalyst comprising a metal oxide containing, for example, Cu, Ni, Zn, V, Zr, or any mixture thereof. In some or other embodiments, the condensation catalyst may comprise a zinc aluminate containing, for example, Pt, Pd, Cu, Ni, or any mixture thereof.

In some embodiments, the condensation catalyst may comprise a multi-functional catalyst having both an acidic functionality and a basic functionality. Such condensation catalysts may comprise a hydrotalcite, a zinc-aluminate, a phosphate, Li, Na, K, Cs, B, Rb, Mg, Si, Ca, Sr, Ba, Al, Ce, La, Sc, Y, Zr, Ti, Zn, Cr, or any combination thereof. In further embodiments, the multi-functional catalyst may also include one or more oxides from the group of Ti, Zr, V, Nb, Ta, Mo, Cr, W, Mn, Re, Al, Ga, In, Fe, Co, Ir, Ni, Si, Cu, Zn, Sn, Cd, P, and any combination thereof. In some embodiments, the multi-functional catalyst may include a metal such as, for example, Cu, Ag, Au, Pt, Ni, Fe, Co, Ru, Zn, Cd, Ga, In, Rh, Pd, Ir, Re, Mn, Cr, Mo, W, Sn, Os, alloys or combinations thereof. The basic catalyst may be self-supporting or adhered to a support containing a material such as, for example, carbon, silica, alumina, zirconia, titania, vanadia, ceria, nitride, boron nitride, a heteropolyacid, alloys and mixtures thereof.

In some embodiments, the condensation catalyst may comprise a metal oxide containing Pd, Pt, Cu or Ni. In still other embodiments, the condensation catalyst may comprise an aluminate or a zirconium metal oxide containing Mg and Cu, Pt, Pd or Ni. In still other embodiments, a multi-functional catalyst may comprise a hydroxyapatite (HAP) combined with one or more of the above metals.

In some embodiments, the condensation catalyst may also include a zeolite and other microporous supports that contain Group IA compounds, such as Li, Na, K, Cs and Rb. Preferably, the Group IA material may be present in an amount less than that required to neutralize the acidic nature of the support. A metal function may also be provided by the addition of group VIIIB metals, or Cu, Ga, In, Zn or Sn. In some embodiments, the condensation catalyst may be derived from the combination of MgO and $Al_2O_3$ to form a hydrotalcite material. Another condensation catalyst may comprise a combination of MgO and $ZrO_2$, or a combination of ZnO and $Al_2O_3$. Each of these materials may also contain an additional metal function provided by copper or a Group VIIIB metal, such as Ni, Pd, Pt, or combinations of the foregoing.

The condensation reaction mediated by the condensation catalyst may be carried out in any reactor of suitable design, including continuous-flow, batch, semi-batch or multi-system reactors, without limitation as to design, size, geometry, flow rates, and the like. The reactor system may also use a fluidized catalytic bed system, a swing bed system, fixed bed system, a moving bed system, or a combination of the above. In some embodiments, bi-phasic (e.g., liquid-liquid) and tri-phasic (e.g., liquid-liquid-solid) reactors may be used to carry out the condensation reaction.

In some embodiments, an acid catalyst may be used to optionally dehydrate at least a portion of the reaction product. Suitable acid catalysts for use in the dehydration reaction may include, but are not limited to, mineral acids (e.g., HCl, $H_2SO_4$), solid acids (e.g., zeolites, ion-exchange resins) and acid salts (e.g., $LaCl_3$). Additional acid catalysts may include, without limitation, zeolites, carbides, nitrides, zirconia, alumina, silica, aluminosilicates, phosphates, titanium oxides, zinc oxides, vanadium oxides, lanthanum oxides, yttrium oxides, scandium oxides, magnesium oxides, cerium oxides, barium oxides, calcium oxides, hydroxides, heteropolyacids, inorganic acids, acid modified resins, base modified resins, and any combination thereof. In some embodiments, the dehydration catalyst may also include a modifier. Suitable modifiers may include, for example, La, Y, Sc, P, B, Bi, Li, Na, K, Rb, Cs, Mg, Ca, Sr, Ba, and any combination thereof. The modifiers may be useful, inter alia, to carry out a concerted hydrogenation/dehydrogenation reaction with the dehydration reaction. In some embodiments, the dehydration catalyst may also include a metal. Suitable metals may include, for example, Cu, Ag, Au, Pt, Ni, Fe, Co, Ru, Zn, Cd, Ga, In, Rh, Pd, Ir, Re, Mn, Cr, Mo, W, Sn, Os, alloys, and any combination thereof. The dehydration catalyst may be self supporting, supported on an inert support or resin, or it may be dissolved in a fluid.

Various operations may optionally be performed on product mixture 13 and/or hydrocatalytically treated mixture 18, preferably as overhead fraction 15, and/or overhead product 118 prior to conducting a condensation reaction. In addition, various operations may optionally be performed on a fluid phase containing products subject to further processing, thereby further transforming these products or placing them in a form more suitable for taking part in a condensation reaction. These optional operations are now described in more detail below.

As described above, one or more liquid phases may be present when digesting cellulosic biomass solids. Particularly when cellulosic biomass solids are fed continuously or semi-continuously to the hydrothermal digestion unit, digestion of the cellulosic biomass solids may produce multiple liquid phases in the hydrothermal digestion unit. The liquid phases may be immiscible with one another, or they may be at least partially miscible with one another. In some embodiments, the one or more liquid phases contained in products subject to further processing may comprise a phenolics liquid phase comprising lignin or a product formed therefrom, an aqueous phase comprising an alcoholic component, a light organics phase, or any combination thereof.

In some embodiments, heating of biomass feedstock 11 and the fluid phase digestion medium to form soluble carbohydrates and a phenolics liquid phase may take place while biomass feedstock 11 is in a pressurized state. As used herein, the term "pressurized state" refers to a pressure that is greater than atmospheric pressure (1 bar). Heating a fluid phase digestion medium in a pressurized state may allow the normal boiling point of the digestion solvent to be exceeded, thereby allowing the rate of hydrothermal digestion to be increased relative to lower temperature digestion processes. In some embodiments, heating biomass feedstock 11 and the fluid phase digestion medium may take place at a pressure of at least about 30 bar. In some embodiments, heating biomass feedstock 11 and the fluid phase digestion medium may take place at a pressure of at least about 60 bar, or at a pressure of at least about 90 bar. In some embodiments, heating biomass feedstock 11 and the fluid phase digestion medium may take place at a pressure ranging between about 30 bar and about 430 bar. In some embodiments, heating biomass feedstock 11 and the fluid phase digestion medium may take place at a pressure ranging between about 50 bar and about 330 bar, or at a pressure ranging between about 70 bar and about 130 bar, or at a pressure ranging between about 30 bar and about 130 bar.

To facilitate a better understanding of the present invention, the following examples of preferred embodiments are given. In no way should the following examples be read to limit, or to define, the scope of the invention.

EXAMPLES

To facilitate a better understanding of the present invention, the following examples of preferred embodiments are given. In no way should the following examples be read to limit, or to define, the scope of the invention.

Example 1

A 100-ml Parr reactor was charged with 60.18 grams of deionized water solvent, and 0.754 grams of nickel-oxide promoted cobalt molybdate catalyst (DC-2534, containing 1-10% cobalt oxide and molybdenum trioxide (up to 30 wt %) on alumina, and less than 2% nickel), obtained from Criterion Catalyst & Technologies L.P. The catalyst was sulfided by the method described in Example 5 of U.S. Application Publication No. 2010/0236988. The reactor was charged with about 5.05 grams of southern pine mini-chips (39% moisture, having a nominal size of about 3 mm×5 mm×5 mm in dimension), and about 0.195 grams of potassium carbonate buffer, before pressuring with 54 bar of hydrogen under magnetic stirring. The stirred reactor was heated to 190° C. for 1 hour. Subsequently, the reactor was heated to 250° C. for 5 hours, which was the end of a cycle. A sample of about 1-2 grams of mixed product was removed via a 0.5 micron sintered metal dip tube at the end of the cycle, while the reactor was still at reaction temperature and stirred. At the end of a cycle, the reactor was cooled, depressurized, and opened for additional wood to be added. Wood addition for cycles 2 through 5 entailed addition of 4.91, 5.09, 5.84, and 5.59 grams of wood. For cycle 6, 2.5 grams of glycerol were added to assess kinetics. For cycle 7, 5.9 grams of nominal 39% moisture ground pine chips were added. For cycle 8, 6.5 grams of pine chips were added. Following the addition of material (wood or glycerol) at the beginning of each cycle, the reactor was repressurized with hydrogen, and again reheated to initiate another cycle. After eight cycles of adding wood or glycerol, the 0.5 micron sintered metal dip tube plugged, and it was not possible to sample the mixed reaction phases. The mixture from the reactant was cooled down and a bottom fraction was separated by liquid-liquid separation. The bottom fraction exhibited a viscosity of greater than about 10,000 cP, measured via timing and flow on an inclined plane while reheating to about 110 degrees C.

The bottom fraction was analyzed by gas chromatography ("DB5-ox method") via dissolving the sample in excess acetone solvent using a 60-m×0.32 mm ID DB-5 column of 1 μm thickness, with 50:1 split ratio, 2 ml/min helium flow, and column oven at 40° C. for 8 minutes, followed by ramp to 285° C. at 10° C./min, and a hold time of 53.5 minutes. The injector temperature was set at 250° C., and the detector temperature was set at 300° C. Analysis revealed the presence of components with a boiling point greater than that of n-butanol, and the bottom fraction included methoxypropyl phenol and tetrahydrofurfural alcohol. The total weight percent of species detected in the bottom fraction was less than 100%, indicating the presence of higher molecular weight oligomers which could not elute from the heated GC injector.

Example 1 shows separation of a bottom fraction containing a lignin-derived phase from a top fraction liquid phase, where the bottom fraction contains phenolics and other heavy oligomers. This bottom fraction can be combusted according to embodiments of the invention.

Example 2

Example 1 was repeated with 60.06 grams of 25% ethanol in water as solvent, and 0.749 grams of sulfided cobalt molybdate catalyst. The reactor was pressurized to 52 bar with hydrogen, and heated to 190° C. for 1 hour, then to 250° C. for 3 hours, and subsequently to 270° C. for 2 hours. After 8 cycles of adding 6 grams of wood for each cycle as described above in Example 1, formation of a viscous phase on reactor internals was observed. The viscous phase exhibited a viscosity greater than 1000 cP at room temperature. This phase was separated using liquid-liquid separation to generate a bottom fraction. Analysis of this heavy bottoms fraction again revealed the presence of compounds with a boiling point that is higher than that of n-butanol, including tetrahydrofurfural alcohol and methoxypropyl phenol and propyl phenol. The total weight percent of species detected in the bottom fraction was less than 100%, indicating the presence of higher molecular weight oligomers which could not elute from the heated GC injector. Example 2 also shows the formation of a heavy phase which can be separated from a main reaction mixture by gravity settling, and which can be combusted according to embodiments of the invention.

Example 3

Example 1 was repeated with 50% ethanol in water as solvent. A heavy viscous phase coating internals and the bottom of the reactor was observed after 10 cycles of adding wood chips as described above in Example 1, with viscosity greater than 10,000 cP. Wood additions comprised 6.05, 6.06, 6.06, 6.06, 6.01, 6.00, 6.01, 6.02, 6.06, and 6.06 for completion of ten cycles. After the 10 cycles, the reactor was subjected to 5 hours of treatment under 52 bar of $H_2$ at 290° C., upon which the viscosity of the lower layer was reduced to less than about 500 cP. The high temperature hydrogen treatment led to increased formation of methoxy and alkyl phenols, such that the observed weight percent of compounds in the GC was more than 3-fold higher than for the similar phase formed in Example 2. The treated phase can be distilled to remove the components of lower volatility that can elute from a GC injector. The remaining bottom fraction containing heavy components, which comprise the unseen weight percent in the GC analysis, can be routed to a recovery unit for combustion according to embodiments of the invention.

Example 4

A 100-ml Parr reactor was charged with a solvent mixture comprising 29.3 grams of 1,2-propylene glycol, 3.3 grams of ethylene glycol, and 32.5 grams of deionized water. 0.75 grams of nickel-oxide promoted cobalt molybdate catalyst were added (DC-2534, containing 1-10% cobalt oxide and molybdenum trioxide (up to 30 wt %) on alumina, and less than 2% nickel), obtained from Criterion Catalyst & Technologies L.P., and sulfided by the method described in US2010/0236988 Example 5.

The reactor was charged with 6.1 grams of southern pine mini-chips (39% moisture), of nominal size 3×5×5 mm in dimension, before pressuring with 53 bar of hydrogen. The stirred reactor was heated to 190° C. for 1 hour, and subsequently heated to 250° C. for 5 hours to complete a cycle as described above in Example 1.

At the end of each cycle, 5.4 grams of product were withdrawn via a pipette. 6.0 grams of wood were charged to initiate a second reaction cycle using the protocol described in Example 1, along with 0.05 to 0.15 grams of buffer as needed to maintain pH between 5 and 6. Reactor product after each cycle was analyzed by gas chromatography using a 60-m×0.32 mm ID DB-5 column of 1 µm thickness, with 50:1 split ratio, 2 ml/min helium flow, and column oven at 40° C. for 8 minutes, followed by ramp to 285° C. at 10° C./min, and a hold time of 53.5 minutes. The injector temperature was set at 250° C., and the detector temperature was set at 300° C. The reaction sequence was continued through 45 cycles. At the end of cycle 45, 19.1262 grams of aqueous phase were decanted from the viscous heavy components phase. The remaining viscous heavy components phase can be combusted according to embodiments of the invention.

A distillation of the aqueous layer was conducted at ambient pressure under N2 blanket, using a 50-ml micro flask with short-path distillation head. The distillation was continued until 58% of the initial still contents were collected as overhead distillate. A first distillation cut was taken as bottoms temperature increased from 120 to 168 degrees C. A second distillation cut was taken at bottoms temperatures between 169 and 186 degrees C. The atmospheric distillation was terminated at 196.9 degrees C. bottoms temperature, and gave a fraction comprising diols and acids.

The distillation of this fraction was resumed under vacuum at a nominal pressure of 10 Torr. A maximum temperature of 279 degrees C. was obtained, and 32% of the heavy ends from vacuum distillation were recovered as overhead distillate. The resulting bottom fraction from vacuum distillation was dissolved in dichloromethane and analyzed by GC MS. Many components were too heavy to analyze. Overall structures resembled asphaltenes, with some phenolic groups present.

The distillation bottoms flask was unwrapped and tipped sideways to demonstrate flow of heavy residue at a bottoms temperature of about 268 degrees C., at an estimated viscosity in excess of 1000 cP. About 82% of the final residue could be poured out of the hot flask. Upon cooling, the residue would not flow and required removal by spatula for sampling.

This example shows thermal distillation of intermediate production from digestion-reaction of wood biomass using a catalyst capable of activating molecular hydrogen, under a hydrogen atmosphere. Mono- and di-oxygenates which can be coupled via condensation-oligomerization reactions could be separated by distillation at atmospheric pressure and under vacuum, leaving a heavy tar-like residue. The heavy residue could be kept molten to flow out of distillation kettle when heated above 250 degrees C. This bottom fraction from vacuum distillation containing heavy residues can be combusted according to embodiments of the present invention. Alternatively, the temperature of the atmospheric distillation can be increased to produce a bottom fraction that may be routed to a recovery unit for combustion according to embodiments of the present invention.

Example 5

Example 4 was repeated using 4-methyl-2-pentanol (methyl isobutyl carbinol or "MIBC") as the digestion medium, and with use of larger scale batches were run conducted in a 450 mL Parr reactor. The reactor was initially charged with 220.06 g of MIBC, 25.08 g deionized water, 0.855 g of potassium carbonate buffer, and 8.1065 g of sulfided cobalt-molybdate catalyst as described in Example 1. For each reaction cycle, 27 g of softwood pine mini-chips were added, and an equivalent amount of liquid sample was removed at the end of each cycle. For liquid sample removal after each cycle, a portion of the lower aqueous layer was removed from as liquid above the settled catalyst layer, if present, followed by removal of a sufficient amount of the upper layer if required to maintain the liquid inventory in the reactor at a 60% level. After 17 cycles, a sample of the upper layer was distilled at atmospheric pressure under nitrogen, followed by vacuum distillation at 10 Torr. Distillate cut number 2 was collected under nitrogen at atmospheric pressure with a kettle bottoms temperature of about 110 to 140 degrees C. and an overheads temperature of about 90 degrees C. Cut number 2 contains a mixture of oxygenated and alkane intermediates. With a kettle temperature of about 258 to 302 degrees C., a vacuum distillation cut containing an estimated 30% of the reactor product was obtained as distillate cut number 6. In addition to alcohols (including glycols and other diols), significant quantities of phenolic compounds were obtained in cut number 6. For example, methoxy propyl phenol was found to be present in quantities greater than 4%. Tetrahydrofurfural alcohol was also found as a significant reaction product. No observable viscous layer or tar was formed under the experimental conditions of Example 5. A final vacuum distillation cut representing the end point of distillation (final 1% of feed) is produced and reported in Table 1 below.

TABLE 1

| Final vacuum distillation cut at 348 degrees C. bottom temperature | |
|---|---|
| Name | area % |
| acetone (diluent) | N/A |
| 1-butanol (internal standard) | N/A |
| 4-methyl-2-Pentanol | N/A |
| tetrahydro Furanmethanol | 3.27% |
| phenol | 6.93% |
| methoxy phenol | 8.61% |
| methyl phenol | 12.39% |
| unknown | 3.89% |
| dimethy phenol | 7.37% |
| methyl methoxy phenol | 6.27% |
| ethyl phenol | 6.15% |
| methyl ethyl phenol | 5.51% |
| unknown | 2.58% |
| ethyl methoxy phenol | 5.24% |
| unknown | 3.76% |
| propyl phenol | 6.09% |
| unknown | 0.91% |
| benzene diol | 5.24% |
| propyl methoxy phenol | 6.30% |
| unknown | 1.15% |
| unknown | 2.50% |
| unknown | 5.84% |

The distillation flask bottoms after distillation with a final temperature of about 345 degrees C. continued to boil and bubble, but formed a solid char with resemblance to coal, upon cooling to room temperature. This example shows digestion and reaction intermediates. Distillation allows removal of monooxygenates and diols, with some phenols. Some heavy tar components with separation points in excess of 350 degrees C. remain in the bottoms, and for a char phase upon cooling. At least one of distillation cut number 6, the final vacuum distillation cut, and the heavy tar components remaining in the bottoms can be combusted according to embodiments of the invention.

Example 6

Example 5 was repeated with 34 cycles of wood addition. Distillation was conducted at atmospheric pressure under $N_2$ to remove 85% of the reactor contents as overhead product, analyzed as a mixture of monooxygenates and some diols. The remaining 15% kettle bottoms formed a non-flowable viscous tar at room temperature, for which dissolution in acetone solvent required reheating. The remaining 15% kettle bottoms can be combusted according to embodiments of the invention.

The particular embodiments disclosed above are illustrative only, as embodiments of the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods may also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

We claim:

1. A method comprising:
providing a biomass feedstock comprising cellulose and water;
digesting at least a portion of the biomass feedstock to generate a digested product;
separating the digested product in a separation zone into at least an overhead fraction comprising a plurality of oxygenated hydrocarbon molecules and a bottom fraction comprising (i) at least one compound having a separation point having a temperature in a range of about 100 to 600 degrees C. and a pressure of about atmospheric pressure, and (ii) at least one volatile organic compound;
providing the bottom fraction from the separation zone to a recovery unit;
vaporizing in the recovery unit the at least one volatile organic compound in the bottom fraction to generate an overhead product, wherein said vaporization is achieved using at least a heat exchange component of the recovery unit, said heat exchange component adapted to transfer thermal energy between a thermal exchange fluid and the bottom fraction;
providing the bottom fraction from an outlet of the heat exchange component to a furnace component of the recovery unit;
combusting at least a portion of the bottom fraction without the vaporized at least one compound in the furnace component to generate at least a portion of the thermal exchange fluid;
and providing at least a portion of the thermal exchange fluid generated by the furnace component to the heat exchange component.

2. The method of claim 1 further comprising:
providing at least a portion of the oxygenated hydrocarbon molecules in the overhead fraction from the separation zone to a further processing zone; and
converting said oxygenated hydrogen molecules in the further processing zone to a product stream comprising a higher molecular weight compound comprising $\geq C_4$ hydrocarbons.

3. The method of claim 1 wherein the overhead product from the recovery unit comprises a plurality of oxygenated hydrocarbon molecules.

4. The method of claim 3 further comprising
providing at least a portion of the oxygenated hydrocarbon molecules in the overhead product from the recovery unit to a further processing zone; and
converting at least a portion of the oxygenated hydrocarbon molecules in the overhead product to a product stream comprising a higher molecular weight compound comprising $\geq C_4$ hydrocarbons.

5. The method of claim 1 wherein the bottom fraction comprises at least one compound having a separation point having a temperature in a range of about 100 to 500 degrees C. and a pressure in a range of about 1 to 100 Torr.

6. The method of claim 1 wherein the vaporizing step comprises multistage distillation of the bottom fraction.

7. The method of claim 1 wherein the vaporizing step comprises applying a temperature in a range of about 100 to 600 degrees C. and a pressure of 0.01 to 250 psi to the bottom fraction.

8. The method of claim 1 wherein the bottom fraction comprises at least one of lignin, a lignin-derived compound, unextracted cellulose, unextracted hemicellulose, a caramelan, and any combination thereof.

9. The method of claim 1 further comprising:
contacting the biomass feedstock with hydrogen in the presence of a catalyst capable of activating molecular hydrogen at a temperature in a range of about 180 degrees C. to 290 degrees C. to form a hydrocatalytically treated mixture;
wherein the separating step comprises:
separating the hydrocatalytically treated mixture in a separation zone into at least an overhead fraction comprising a plurality of oxygenated hydrocarbon molecules and a bottom fraction comprising (i) at least one compound having a separation point having a temperature in a range of about 100 to 600 degrees C. and a pressure of about atmospheric pressure, and (ii) at least one volatile organic compound, wherein the first bottom fraction comprises at least one of phenol, ocresol, p-cresol, anisole, 4-methylanisole, catechol, guaiacol, 4-methylguaiacol, 1,3-dimethoxybenzene, syringol, vanillin, methoxyphenol, methyl phenol, dimethyl phenol, ethyl phenol, methyl ethyl phenol, methoxypropylphenol, benzene diol, and propyl phenol.

10. The method of claim 1 wherein the heat exchange component comprises a shell and tube heat exchanger.

11. The method of claim 1 wherein the furnace component further comprises a port to allow an oxygen containing fluid to enter for combustion.

12. The method of claim 1 wherein the heat exchange component is disposed in the furnace component.

13. The method of claim 12 wherein the heat exchange component is positioned above a combustion zone of the furnace component.

14. The method of claim 1 further comprising preheating at least a portion of the bottom fraction prior to providing it to the recovery unit using at least an economizer component.

15. The method of claim 1 further comprising increasing the temperature of at least a portion of the bottom fraction in the heat exchange component using at least a superheater.

16. The method of claim 1 wherein the furnace component further comprises at least one tube-lined wall.

* * * * *